US011071296B2

(12) United States Patent
Egan et al.

(10) Patent No.: US 11,071,296 B2
(45) Date of Patent: Jul. 27, 2021

(54) LIQUID SULFONYLUREA-CONTAINING HERBICIDAL COMPOSITIONS

(71) Applicants: Mitsui AgriScience International S.A./N.V., Dublin (IE); Battelle UK Limited, Chelmsford (GB)

(72) Inventors: Oliver Egan, Navan (IE); Andrew Goldsmith, Waterlooville (GB)

(73) Assignees: Mitsui AgriScience International S.A./N.V., Dublin (IE); Battelle UK Limited, Chelmsford (GB)

( * ) Notice: Subject to any disclaimer, the term of this patent is extended or adjusted under 35 U.S.C. 154(b) by 0 days.

(21) Appl. No.: 15/538,158

(22) PCT Filed: Dec. 21, 2015

(86) PCT No.: PCT/EP2015/080844
§ 371 (c)(1),
(2) Date: Jun. 20, 2017

(87) PCT Pub. No.: WO2016/102499
PCT Pub. Date: Jun. 30, 2016

(65) Prior Publication Data
US 2018/0000069 A1    Jan. 4, 2018

(30) Foreign Application Priority Data
Dec. 22, 2014    (EP) .................................... 14199867

(51) Int. Cl.
*A01N 25/04*    (2006.01)
*A01N 47/36*    (2006.01)
*A01N 25/30*    (2006.01)
*A01N 59/26*    (2006.01)
*A01N 59/04*    (2006.01)
*A01N 59/06*    (2006.01)
*A01N 59/08*    (2006.01)
*A01N 43/40*    (2006.01)
*A01N 25/22*    (2006.01)

(52) U.S. Cl.
CPC ............ *A01N 25/04* (2013.01); *A01N 25/22* (2013.01); *A01N 25/30* (2013.01); *A01N 43/40* (2013.01); *A01N 47/36* (2013.01); *A01N 59/04* (2013.01); *A01N 59/06* (2013.01); *A01N 59/08* (2013.01); *A01N 59/26* (2013.01)

(58) Field of Classification Search
CPC ........ A01N 25/04; A01N 25/22; A01N 47/36; A01N 25/30; A01N 43/40; A01N 59/04; A01N 59/26; A01N 59/06; A01N 59/08
See application file for complete search history.

(56) References Cited

U.S. PATENT DOCUMENTS

| 4,062,889 | A | 12/1977 | Eric et al. |
|---|---|---|---|
| 4,599,412 | A | 7/1986 | Sandell |
| 4,690,707 | A | 9/1987 | Föry et al. |
| 4,936,900 | A | 6/1990 | Hyson |
| 6,015,571 | A | 1/2000 | Scher et al. |
| 6,559,098 | B1 | 5/2003 | Bratz et al. |
| 2003/0022794 | A1 | 1/2003 | Wysong et al. |
| 2005/0026787 | A1 | 2/2005 | Deckwer et al. |
| 2006/0205596 | A1 | 9/2006 | Deckwer et al. |
| 2006/0276337 | A1 | 12/2006 | Sixl et al. |
| 2011/0077157 | A1 | 3/2011 | Sixl et al. |
| 2012/0309621 | A1* | 12/2012 | Lee ...................... A01N 25/28 504/133 |
| 2014/0296071 | A1 | 10/2014 | Bristow |
| 2015/0105259 | A1 | 4/2015 | Sixl et al. |
| 2015/0126370 | A1* | 5/2015 | Bristow ................ A01N 25/12 504/135 |
| 2018/0000069 | A1 | 1/2018 | Egan et al. |
| 2019/0110468 | A1 | 4/2019 | Goldsmith et al. |

FOREIGN PATENT DOCUMENTS

| CA | 2 422 075 A1 | 3/2003 |
|---|---|---|
| CN | 1159881 A | 9/1997 |
| CN | 1181880 A | 5/1998 |
| CN | 1829441 A | 9/2006 |
| CN | 103987256 A | 8/2014 |
| EP | 0 124 285 A2 | 11/1984 |
| EP | 0 124 295 A2 | 11/1984 |
| EP | 0 124 295 B1 | 4/1991 |
| EP | 0 554 015 A1 | 8/1993 |
| EP | 0 554 015 B1 | 3/1995 |
| EP | 1 142 476 A1 | 10/2001 |
| GB | 2 496 643 A | 5/2013 |

(Continued)

OTHER PUBLICATIONS

International Search Report and Written Opinion dated Feb. 19, 2016 in connection with PCT/EP2015/080844.
File history for U.S. Appl. No. 11/435,174, granted as U.S. Pat. No. 7,867,946 on Jan. 1, 2011, 375 pages.
PCT/EP2017/065289, dated Sep. 11, 2017, International Search Report and Written Opinion.
PCT/EP2017/065289, dated Jun. 4, 2018, International Preliminary Report on Patentability (Chapter II).

(Continued)

*Primary Examiner* — John Pak
*Assistant Examiner* — Andriae M Holt
(74) *Attorney, Agent, or Firm* — Wolf, Greenfield & Sacks, P.C.

(57) ABSTRACT

This invention relates to a liquid herbicidal composition comprising a non-aqueous solvent system, at least one sulfonylurea herbicide and at least one inorganic salt selected from the metal carbonates and metal phosphates. The invention also relates to the use of an inorganic salt selected from the metal carbonates and metal phosphates to improve chemical stabilisation of a sulfonylurea herbicide in a liquid composition comprising a non-aqueous solvent system.

12 Claims, No Drawings

(56) References Cited

FOREIGN PATENT DOCUMENTS

| GB | 2496643 A | 5/2013 |
|---|---|---|
| JP | 2000-095620 A | 4/2000 |
| JP | 2007-500144 A | 1/2007 |
| JP | 2007-153870 A | 6/2007 |
| WO | WO 91/03937 A1 | 4/1991 |
| WO | WO 93/22919 A1 | 11/1993 |
| WO | WO 95/13698 | 5/1995 |
| WO | WO 98/34482 A1 | 8/1998 |
| WO | WO 01/070024 A2 | 9/2001 |
| WO | WO 02/17718 A1 | 3/2002 |
| WO | WO 02/062138 A2 | 8/2002 |
| WO | WO 03/051114 A1 | 6/2003 |
| WO | WO 2004/023876 A1 | 3/2004 |
| WO | WO 2006/131187 A1 | 12/2006 |
| WO | WO 2007/018060 A1 | 2/2007 |
| WO | WO 2013/071852 A1 | 5/2013 |
| WO | WO 2013/159731 A1 | 10/2013 |
| WO | WO 2013/174833 A1 | 11/2013 |
| WO | WO 2016/102499 A1 | 6/2016 |

OTHER PUBLICATIONS

International Search Report and Written Opinion dated Sep. 11, 2017 in connection with PCT/EP2017/065289.
International Preliminary Report on Patentability dated Jun. 4, 2018 in connection with PCT/EP2017/065289.

* cited by examiner

LIQUID SULFONYLUREA-CONTAINING HERBICIDAL COMPOSITIONS

CROSS-REFERENCE TO RELATED APPLICATIONS

This application is the National Phase under 35 U.S.C. § 371 of PCT International Application No. PCT/EP2015/080844, filed Dec. 21, 2015, which claims the priority of EP Application No. 14199867.4, filed Dec. 22, 2014, the entire contents of the aforementioned applications are hereby incorporated herein by reference.

1. FIELD OF THE INVENTION

This invention relates to liquid herbicidal compositions comprising a non-aqueous solvent system, at least one sulfonylurea herbicide and at least one inorganic salt selected from the metal carbonates and metal phosphates. The invention also relates to the use of an inorganic salt selected from the metal carbonates and metal phosphates to improve chemical stabilisation of sulfonylurea herbicides in liquid compositions that comprise non-aqueous solvent systems.

2. BACKGROUND OF THE INVENTION

End-users typically prefer liquid herbicidal compositions over solid compositions because they are easier to handle in measuring, pumping, diluting and dispersing in water, and spraying operations and also generally exhibit superior biological efficacy. Typical liquid formulations include oil-based formulations such as oil dispersions (OD), emulsifiable concentrates (EC), and soluble concentrates (SL) where one or more active ingredients are dissolved in and/or suspended in the liquid media of the formulation.

Sulfonylureas are a well-known and important class of herbicides comprising more than 30 active-ingredients that are widely used for controlling a range of annual and perennial broad-leaved weeds and grasses in a wide variety of agricultural and horticultural crops, as well as in turf, pastures and non-crop situations. However, sulfonylureas are known to be unstable as they have a tendency to hydrolyse via cleavage at the sulfonylurea bridge. While this instability is sometimes considered favourable in terms of achieving low soil residues of these compounds, it poses serious problems commercially with respect to the storage stability of the formulated products. Furthermore, some sulfonylurea herbicides are also prone to degradation due to chemical incompatibilities when other herbicidal ingredients are incorporated in the formulation. This makes the development of liquid formulations that comprise sulfonylurea herbicides and additional herbicidal ingredients even more challenging.

While liquid herbicidal formulations such as oil dispersions have been commercially available for a long time (with early patents dating from the 1980's and 1990's such as GB 2,059,773 and U.S. Pat. No. 5,707,928), the inherent chemical instability of sulfonylurea herbicides has limited their widespread use in liquid formulations. Instead, sulfonylurea compounds are normally formulated as powders, granules and tablets (e.g. see EP 0 764 404 A1, WO 98/34482 A1, WO 93/13658 A1, and WO 02/17718 A1). However, some efforts to stabilise liquid formulations of sulfonylurea herbicides have been described in the art.

For instance, US 2006/0276337 A1 (Bayer CropScience GmbH) describes an oil suspension concentrate comprising one or more pyridylsulfonylurea compounds suspended in one or more organic solvents optionally with a sulfosuccinate salt. The oil suspensions are reported to be storage-stable but no quantitative measurement regarding stability is provided.

WO 2007/027863 A2 (El. du Pont de Nemours & Co.) is also concerned with providing stable sulfonylurea-containing liquid compositions and describes an oil suspension concentrate comprising one or more sulfonylurea herbicides, additionally one or more fatty acid esters of C1-C4 alkanols, and a lignosulfonate. The stability of these compositions was found to vary dependent on the sulfonylurea that was used. Although the document is concerned with providing stable compositions, up to 66.5% of tribenuron-methyl was lost after only one week of storage at 40° C.

U.S. Pat. No. 5,731,264 (ISP Investments Inc.) describes a liquid emulsifiable concentrate comprising a sulfonylurea and a mixture of anionic and non-ionic surfactants dissolved in a solvent selected from gamma-butyrolactone, propylene glycol or propylene carbonate or mixtures thereof. The obtained formulations, comprising metsulfuron-methyl which is considered to be of average stability, are reported to have a half-life of 5.8 days at 52° C. After 5 days, between 25-30% of the metsulfuron methyl was lost depending on the selected solvent.

WO 2008/155108 A2 (GAT Microencapsulation AG) describes oil suspensions of sulfonylureas and organomodified silane compounds that are reportedly stable when stored at comparatively gentle accelerated storage conditions of 35° C. for 15 days. In WO 2009/152827 A2 (also GAT Microencapsulation AG) the more usual accelerated storage conditions of 54° C. for two weeks are used but in this document the chemical stability of the sulfonylurea in the suspension concentrates is not reported.

EP 0554015 A1 (Ishihara Sangyo Kaisha, Ltd.) describes a chemically stabilized herbicidal oil-based suspension, comprising N-[(4,6-dimethoxypyrimidin-2-yl) aminocarbonyl-3-dimethylaminocarbonyl-2-pyridinesulfonamide and/or its salt as an effective herbicidal component, urea, a vegetable oil and/or mineral oil, a surfactant and, optionally other ingredients such as an additional herbicidal component, a thickener, a solvent and other adjuvants. According to that document, urea is added to suppress decomposition of the effective herbicidal component and to provide a chemically stabilized herbicidal oil-based suspension.

GB 2496643 A (Rotam Agrochem International Company Ltd.) aims to improve the suspension concentrate described in EP 0554015 A1. This document is concerned with pyridine sulfonamides (i.e. pyridylsulfonylureas) and teaches to add a polyether-polysiloxane to the composition to counteract supposed poor spreading and water dispersibility caused by the addition of urea or other stabilizers to a suspension concentrate.

EP 0 124 295 A2 (E.I. du Pont de Nemours & Co.) reports that aqueous suspensions of sulfonylureas can be stabilized by the presence of ammonium, substituted ammonium or alkali metal salts of carboxylic acid or inorganic acid provided that the salts exhibit specific solubility and pH properties. Exemplary salts are said to be diammonium hydrogen phosphate, ammonium acetate, lithium acetate, sodium acetate, potassium acetate, or sodium thiocyanate.

WO 03/051114 A1 (ISP Investments Inc.) is concerned with increasing the shelf-life of an oil-in-water microemulsion containing a biologically active aza type compound. The oil-in-water microemulsion contains from 90 to 99.99 wt. % water. Shelf-life is said to be extended by the addition of a buffering agent to the emulsion. The buffering agent is an alkaline buffering agent such as an inorganic Na, K and or NH$_4$ salt of a phenol, a polyphenol or a weak acid; an alkanol amine; a polyamine salt of a weak acid or a mixture of these buffering agents. No stability data is provided for any sulfonylurea-containing formulations.

WO 2013/174833 A1 (Bayer CropScience AG) describes an oil dispersion formulation of iodosulfuron-methyl sodium salt which comprise hydroxystearates, in particular lithium hydroxystearate as both a thickener and a stabilizer for the sulfonylurea.

Despite the available art described above, only a small number of the more intrinsically stable sulfonylureas such as nicosulfuron, bensulfuron-methyl and mesosulfuron-methyl have been incorporated into commercially successful liquid formulations. Despite their lengthy presence in the market, there are still no available liquid formulations of many important sulfonylureas including tribenuron-methyl, thifensulfuron-methyl, chiorimuron-ethyl, rimsulfuron and suifosulfuron. There is a clear need for an improved formulation system to reliably deliver liquid formulations of improved chemical stability for a broader range of sulfonylureas and for co-formulated mixtures of sulfonylureas with non-sulfonylurea herbicides.

3. SUMMARY OF THE INVENTION

The present invention is based on the surprising finding that the chemical stability of many sulfonylureas in liquid composition comprising a non-aqueous solvent system can be improved by incorporating an inorganic salt selected from the metal carbonates and metal phosphates into the composition.

Accordingly, the present invention relates to liquid herbicidal compositions comprising: a non-aqueous solvent system; at least one sulfonylurea herbicide; and at least one inorganic salt selected from the metal carbonates and metal phosphates. The inorganic salt preferably comprises a metal selected from Na, K, Ca, Mg or Al and/or is an inorganic salt selected from the alkali metal phosphates and the alkali metal carbonates. Preferred inorganic salts are Na$_3$PO$_4$, K$_3$PO$_4$, Mg$_3$(PO$_4$)$_2$, AlPO$_4$, and Na$_2$CO$_3$. The present invention is suitable for chemically stabilising liquid compositions comprising one, two, three, four or more different sulfonylurea compounds.

The liquid herbicidal composition is preferably formulated as an oil dispersion (OD), a dispersible concentrate (DC), an emulsifiable concentrate (EC), or a soluble concentrate (SL). At least one sulfonylurea is dissolved, suspended or otherwise contained in the non-aqueous solvent system. At least one inorganic salt selected from the metal carbonates and metal phosphates is dissolved, suspended or otherwise contained in the non-aqueous solvent system.

The liquid herbicidal composition of the invention may comprise one or more non-sulfonylurea herbicides that are suspended, dissolved or otherwise contained in the non-aqueous solvent system. The present invention is particularly suitable for improving the chemical stability of a sulfonylurea in the presence of a non-sulfonylurea herbicide that would ordinarily impair its chemical stability.

The liquid herbicidal composition may comprise one or more safeners. The liquid herbicidal composition may also comprise co-formulants such as surfactants, particularly non-ionic surfactants.

The invention also relates to the use of an inorganic salt selected from the metal carbonates and metal phosphates to improve chemical stabilisation of a sulfonylurea herbicide in a liquid composition that comprises a non-aqueous solvent system.

4. DETAILED DESCRIPTION OF THE INVENTION

4.1 General Remarks

As used herein, the terms "comprises", "comprising", "includes", "including", "has", "having" or any other variation thereof, are intended to cover a non-exclusive inclusion. For example, a composition that comprises a list of components is not necessarily limited to only those components but may include other components that are not expressly listed or inherent to such a composition. That said, the terms "comprises", "comprising", "includes", "including", "has", "having" or any other variation thereof also cover the disclosed embodiment having no further additional components (i.e. consisting of those components). By way of example, a composition comprising a sulfonylurea, an inorganic salt, an organic solvent, and a surfactant discloses the composition with just these four components as well as compositions comprising these four components along with other unmentioned components.

Also, the indefinite articles "a" and "an" preceding an element or component of the invention are intended to be non-restrictive regarding the number of instances (i.e. occurrences) of the element or component. Therefore "a" or "an" should be read to include one or at least one, and the singular word form of the element or component also includes the plural unless the number is obviously meant to be singular. By way of example, reference to a composition comprising a surfactant should be understood to mean that the composition comprises one or at least one surfactant unless specified otherwise.

Further, when an aspect of the invention is described as being 'preferred', it should be understood that this preferred aspect of the invention can be combined with other preferred aspects of the invention. As an example, if tribenuron-methyl is described in a list of preferred sulfonylureas, isobornyl acetate is described in a list of preferred organic solvents, and ethoxylated polyarylphenol in a list of preferred surfactants, then the present disclosure should be taken as a disclosure of a composition incorporating these preferred components.

4.2 Liquid Composition

The herbicidal composition of the invention is a liquid. By "liquid" is meant that the composition takes the form of a liquid at standard temperature and pressure. Suitable liquid compositions that can be used in the present invention include the oil-based liquid formulations defined in the "*Catalogue of pesticide formulation types and international coding system*", Technical Monograph No. 2, 6th Ed. May 2008, CropLife International. Exemplary liquid compositions for use in the present invention include a dispersible concentrate (DC), an emulsifiable concentrate (EC), the liquid part(s) of a solid/liquid (KK) or liquid/liquid (KL) combi-pack, an oil dispersion (OD), an oil miscible flowable concentrate (OF), an oil miscible liquid (OL), an oil-based soluble concentrate (SL), a spreading oil (SO), an oil-based ultra-low volume liquid (UL) or suspension (SU), or any other oil-based liquid not yet designated by a specific code in the CropLife monograph (AL). Of these, oil dispersions (OD), dispersible concentrates (DC), emulsifiable concentrates (EC), and oil-based soluble concentrates (SL) are preferred. These and other formulations are known in the art and are described, for example, in "*Pesticide Formulations*"

(1973) by Wade van Valkenburg, and "New Trends in Crop Protection Formulations" (2013) edited by Alan Knowles.

The invention is particularly suited to improving the chemical stability of sulfonylureas in oil dispersions (OD), emulsifiable concentrates (EC), and soluble concentrates (SL). Accordingly, these types of formulation are the most preferred for the present invention. The term "oil dispersion" is to be understood as meaning a dispersion concentrate based on a non-aqueous solvent in which one or more solid active compounds are suspended and wherein further active ingredients are optionally dissolved in the non-aqueous solvent. In one embodiment at least one sulfonylurea compound is suspended in the non-aqueous solvent system. Additional sulfonylurea compounds may be co-suspended and/or dissolved in the non-aqueous solvent system. In addition to the one or more sulfonylurea compounds, one or more non-sulfonylurea herbicidal compounds may be suspended and/or dissolved in the non-aqueous solvent system. Preferably the inorganic salt is also suspended in the non-aqueous solvent system.

In the absence of any indication to the contrary, the terms "suspended" and "dissolved" take their ordinary meaning in this technical field. Whether a compound is suspended or dissolved can be determined at standard temperature and pressure. For the avoidance of any doubt, the term "suspended" can be taken to mean that 80 wt. % or more, preferably 90 wt. % or more, even more preferably 95 wt. % or more of the compound in question is suspended within the liquid composition whereas the term "dissolved" can be taken to mean that 90 wt. % or more, preferably 95 wt. % or more, even more preferably 99 wt. % or more of the compound in question is dissolved in the liquid composition.

4.3 Sulfonylurea

The liquid composition of the present invention comprises a sulfonylurea. The sulfonylurea is not particularly limited and can be any herbicidal sulfonylurea known in the art or described in the patent literature. For example, the sulfonylurea may be selected from the sulfonylureas listed in the 16$^{th}$ Edition of "The Pesticide Manual" (ISBN-10: 190139686X). By way of a general structure, the sulfonylurea may be a compound according to Formula (I) as described in WO 2007/027863 A2 (E.I. DuPont De Nemours and Company):

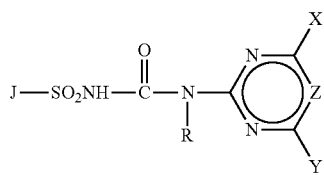

Formula (1)

wherein J is $R^{13}SO_2N(CH_3)$— or J is selected from the group consisting of

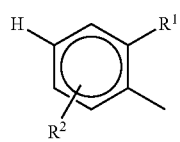

J-1

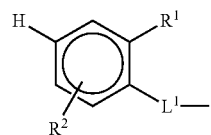

J-2

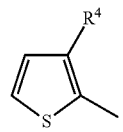

J-3

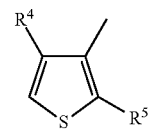

J-4

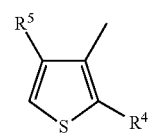

J-5

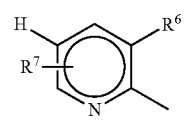

J-6

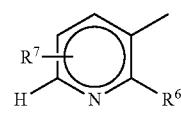

J-7

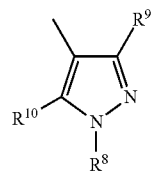

J-8

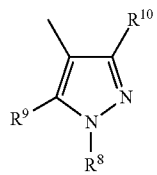

J-9

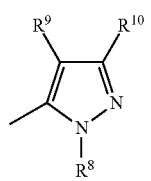

J-10

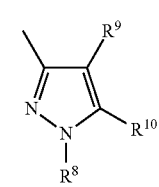

J-11

-continued

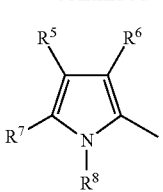
J-12

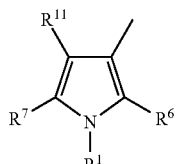
J-13

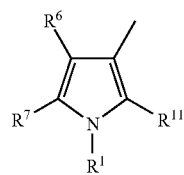
J-14

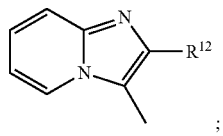
J-15 and wherein:

R is H or CH$_3$;

R$^1$ is F, Cl, Br, NO$_2$, C$_1$-C$_4$ alkyl, C$_1$-C$_4$ haloalkyl, C$_3$-C$_4$ cycloalkyl, C$_2$-C$_4$ haloalkenyl, C$_1$-C$_4$ alkoxy, C$_1$-C$_4$ haloalkoxy, C$_2$-C$_4$ alkoxyalkoxy, CO$_2$R$^{14}$, C(O)NR$^{15}$R$^{16}$, SO2NR$^{17}$R$^{18}$, S(O)$_n$R$^{19}$, C(O)R$^{20}$, CH$_2$CN or L;

R$^2$ is H, F, Cl, Br, I, CN, CH$_3$, OCH$_3$, SCH$_3$, CF$_3$ or OCF$_2$H;

R$^3$ is Cl, NO$_2$, CO$_2$CH$_3$, CO$_2$CH$_2$CH$_3$, C(O)CH$_3$, C(O)CH$_2$CH$_3$, C(O)-cyclopropyl, SO$_2$N(CH$_3$)$_2$, SO$_2$CH$_3$, SO$_2$CH$_2$CH$_3$, OCH$_3$ or OCH$_2$CH$_3$;

R$^4$ is C$_1$-C$_3$ alkyl, C$_1$-C$_2$ haloalkyl, C$_1$-C$_2$ alkoxy, C$_2$-C$_4$ haloalkenyl; F, Cl, Br, NO$_2$, CO$_2$R$^{14}$, C(O)NR$^{15}$R$^{16}$, SO$_2$NR$^{17}$R$^{18}$, S(O)nR$^{19}$, C(O)R$^{20}$ or L;

R$^5$ is H, F, Cl, Br or CH$_3$;

R$^6$ is C$_1$-C$_3$ alkyl optionally substituted with 0-3 F, 0-1 Cl and 0-1 C$_3$-C$_4$ alkoxyacetyloxy, or R$^6$ is C$_1$-C$_2$ alkoxy, C$_2$-C$_4$ haloalkenyl, F, Cl, Br, CO$_2$R$^{14}$, C(O)NR$^{15}$R$^{16}$, SO$_2$NR$^{17}$R$^{18}$, S(O)$_n$R$^{19}$, C(O)R$^{20}$ or L;

R$^7$ is H, F, Cl, CH$_3$ or CF$_3$;

R$^8$ is H, C$_1$-C$_3$ alkyl or pyridyl;

R$^9$ is C$_1$-C$_3$ alkyl, C$_1$-C$_2$ alkoxy, F, Cl, Br, NO$_2$, CO$_2$R$^{14}$, SO$_2$NR$^{17}$R$^{18}$, S(O)$_n$R$^{19}$, OCF$_2$H, C(O)R$^{20}$, C$_2$-C$_4$ haloalkenyl or L;

R$^{10}$ is H, Cl, F, Br, C$_1$-C$_3$ alkyl or C$_1$-C$_2$ alkoxy;

R$^{11}$ is H, C$_1$-C$_3$ alkyl, C$_1$-C$_2$ alkoxy, C$_2$-C$_4$ haloalkenyl, F, Cl, Br, CO$_2$R$^{14}$, C(O)NR$^{15}$R$^{16}$, SO$_2$NR$^{17}$R$^{18}$, S(O)$_n$R$^{19}$, C(O)R$^{20}$ or L;

R$^{12}$ is halogen, C$_1$-C$_4$ alkyl or C$_1$-C$_3$ alkylsulfonyl;

R$^{13}$ is C$_1$-C$_4$ alkyl;

R$^{14}$ is selected from the group consisting of allyl, propargyl, oxetan-3-yl and C$_1$-C$_3$ alkyl optionally substituted by at least one member independently selected from halogen, C$_1$-C$_2$ alkoxy and CN;

R$^{15}$ is H, C$_1$-C$_3$ alkyl or C$_1$-C$_2$ alkoxy;

R$^{16}$ is C$_1$-C$_2$ alkyl;

R$^{17}$ is H, C$_1$-C$_3$ alkyl, C$_1$-C$_2$ alkoxy, allyl or cyclopropyl;

R$^{18}$ is H or C$_1$-C$_3$ alkyl;

R$^{19}$ is C$_1$-C$_3$ alkyl, C$_1$-C$_3$ haloalkyl, allyl or propargyl;

R$^{20}$ is C$_1$-C$_4$ alkyl, C$_1$-C$_4$ haloalkyl or C$_3$-C$_5$ cycloalkyl optionally substituted by halogen;

n is 0, 1 or 2;

L is

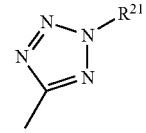

L$^1$ is CH$_2$, NH or O;

R$^{21}$ is selected from the group H and C$_1$-C$_3$ alkyl;

X is selected from the group H, C$_1$-C$_4$ alkyl, C$_1$-C$_4$ alkoxy, C$_1$-C$_4$ haloalkoxy, C$_1$-C$_4$ haloalkyl, C$_1$-C$_4$ haloalkylthio, C$_1$-C$_4$ alkylthio, halogen, C$_2$-C$_5$ alkoxyalkyl, C$_2$-C$_5$ alkoxyalkoxy, amino, C$_1$-C$_3$ alkylamino and di(C$_1$-C$_3$ alkyl) amino;

Y is selected from the group H, C$_1$-C$_4$ alkyl, C$_1$-C$_4$ alkoxy, C$_1$-C$_4$ haloalkoxy, C$_1$-C$_4$ alkylthio, C$_1$-C$_4$ haloalkylthio, C$_2$-C$_5$ alkoxyalkyl, C$_2$-C$_5$ alkoxyalkoxy, amino, C$_1$-C$_3$ alkylamino, di(C$_1$-C$_3$ alkyl)amino, C$_3$-C$_4$ alkenyloxy, C$_3$-C$_4$ alkynyloxy, C$_2$-C$_5$ alkylthioalkyl, C$_2$-C$_5$ alkylsulfinylalkyl, C$_2$-C$_5$ alkylsulfonylalkyl, haloalkyl, C$_2$-C$_4$ alkynyl, C$_3$-C$_5$ cycloalkyl, azido and cyano; and Z is selected from the group CH and N;

provided that (i) when one or both of X and Y is Cl haloalkoxy, then Z is CH; and (ii) when X is halogen, then Z is CH and Y is OCH$_3$, OCH$_2$CH$_3$, N(OCH$_3$)CH$_3$, NHCH$_3$, N(CH$_3$)$_2$ or CF$_2$H.

In Formula (I) above, the term "alkyl", used either alone or in compound words such as "alkylthio" or "haloalkyl" includes a straight-chain or branched alkyl, such as, methyl, ethyl, n-propyl, i-propyl, or the different butyl isomers; "cycloalkyl" includes, for example, cyclopropyl, cyclobutyl and cyclopentyl; "alkenyl" includes straight-chain or branched alkenes such as ethenyl, 1-propenyl, 2-propenyl, and the different butenyl isomers; "alkenyl" also includes polyenes such as 1,2-propadienyl and 2,4-butadienyl; "alkynyl" includes straight-chain or branched alkynes such as ethynyl, 1-propynyl, 2-propynyl and the different butynyl isomers; "alkynyl" can also include moieties comprised of multiple triple bonds such as 2,5-hexadiynyl; "alkoxy" includes, for example, methoxy, ethoxy, n-propyloxy, isopropyloxy and the different butoxy isomers; "alkoxyalkyl" denotes alkoxy substitution on alkyl and examples include CH$_3$OCH$_2$, CH$_3$OCH$_2$CH$_2$, CH$_3$CH$_2$OCH$_2$, CH$_3$CH$_2$CH$_2$CH$_2$OCH$_2$ and CH$_3$CH$_2$OCH$_2$CH$_2$; "alkoxyalkoxy" denotes alkoxy substitution on alkoxy; "alkenyloxy" includes straight-chain or branched alkenyloxy moieties and examples include H$_2$C=CHCH$_2$O, (CH$_3$)CH=CHCH$_2$O and CH$_2$=CHCH$_2$CH$_2$O; "alkynyloxy" includes straight-chain or branched alkynyloxy moieties and examples include HC≡CCH$_2$O and CH$_3$C≡CCH$_2$O; "alkylthio" includes branched or straight-chain alkylthio moieties such as methylthio, ethylthio, and the different propylthio isomers; "alkylthioalkyl" denotes alkylthio substitution on alkyl and examples include CH$_3$SCH$_2$, CH$_3$SCH$_2$CH$_2$, CH$_3$CH$_2$SCH$_2$, CH$_3$CH$_2$CH$_2$CH$_2$SCH$_2$ and CH$_3$CH$_2$SCH$_2$CH$_2$; "alkylsulfinylalkyl" and "alkylsulfonylalkyl" include the corresponding sulfoxides and sulfones, respectively; other substituents such as "alkylamino", "dialkylamino" are defined analogously.

In Formula (I) above the total number of carbon atoms in a substituent group is indicated by the "Cj-Cj" prefix where i and j are numbers from 1 to 5. For example, $C_1$-$C_4$ alkyl designates methyl through butyl, including the various isomers. As further examples, $C_2$ alkoxyalkyl designates $CH_3OCH_2$; $C_3$ alkoxyalkyl designates, for example, $CH_3CH(OCH_3)$, $CH_3OCH_2CH_2$ or $CH_3CH_2OCH_2$; and $C_4$ alkoxyalkyl designates the various isomers of an alkyl group substituted with an alkoxy group containing a total of four carbon atoms, examples including $CH_3CH_2CH_2OCH_2$ and $CH_3CH_2OCH_2CH_2$.

In Formula (I) above the term "halogen", either alone or in compound words such as "haloalkyl", includes fluorine, chlorine, bromine or iodine. Further, when used in compound words such as "haloalkyl", said alkyl may be partially or fully substituted with halogen atoms which may be the same or different. Examples of "haloalkyl" include $F_3C$, $ClCH_2$, $CF_3CH_2$ and $CF_3CCl_2$. The terms "haloalkoxy", "haloalkylthio", and the like, are defined analogously to the term "haloalkyl". Examples of "haloalkoxy" include $CF_3O$, $CCl_3CH_2O$, $HCF_2CH_2CH_2O$ and $CF_3CH_2O$. Examples of "haloalkylthio" include $CCl_3S$, $CF_3S$, $CCl_3CH_2S$ and $ClCH_2CH_2S$.

For this invention, preferable sulfonylureas according to Formula (1) include those where X is selected from the group $C_1$-$C_4$ alkyl, $C_1$-$C_4$ alkoxy, $C_1$-$C_4$ haloalkoxy, halogen, di($C_1$-$C_3$ alkyl)amino and Y is selected from the group $C_1$-$C_4$ alkyl, $C_1$-$C_4$ alkoxy, and $C_1$-$C_4$ haloalkoxy. More preferably, X is selected from $CH_3$, $OCH_3$, Cl, $OCHF_2$, and $N(CH_3)_2$ and Y is selected from $CH_3$, $OCH_3$, $OCHF_2$ and $OCH_2CF_3$.

Preferable sulfonylureas according to Formula (I) also include those where J is J-1, $R^1$ is Cl, $CO_2CH_3$, $CO_2C_2H_5$, $CH_2CH_2CF_3$, or $OCH_2CH_2Cl$, and $R^2$ is H; J is J-1, $R^1$ is $CO_2CH_3$, and $R^2$ is $CH_3$; J is J-2, $R^3$ is $CO_2C_2H_5$, $OCH_2CH_3$, or $COC_3$-cycloalkyl, $L^1$ is $CH_2$, O, or NH, and $R^2$ is H; J is J-5, $R^4$ is $CO_2CH_3$, and $R^5$ is H; J is J-6, $R^6$ is $CON(CH_3)_2$, $SO_2CH_2CH_3$, or $CF_3$, and $R^7$ is H; J is J-10, $R^8$ is $CH_3$, $R^9$ is $CO_2CH_3$ and $R^{10}$ is Cl.

For the purpose of this invention, the sulfonylurea according to Formula (I), or any of the exemplary sulfonylureas mentioned herein, is to be understood as meaning all of the usual use forms in this technical field, such as acids, esters, salts and isomers. In this invention the salt includes acid-addition salts with inorganic or organic acids such as hydrobromic, hydrochloric, nitric, phosphoric, sulfuric, acetic, butyric, fumaric, lactic, maleic, malonic, oxalic, propionic, salicylic, tartaric, 4-toluenesulfonic or valeric acids. Also included are salts formed with organic bases (e.g., pyridine, ammonia, or triethylamine) or inorganic bases (e.g., hydrides, hydroxides, or carbonates of sodium, potassium, lithium, calcium, magnesium or barium). Preferred salts of the sulfonylureas according to Formula (I), or the exemplary sulfonylureas mentioned herein, include lithium, sodium, potassium, triethylammonium, and quaternary ammonium salts. Preferred esters for the purpose of this invention are the alkyl esters, in particular the $C_1$-$C_{10}$-alkyl esters, such as methyl and ethyl esters.

Exemplary sulfonylureas according to Formula (I) that can be used for this invention include:
amidosulfuron (N-[[[[(4,6-dimethoxy-2-pyrimdinyl)amino]carbonyl]amino]sulfonyl]-N-methylmethanesulfonamide),
azimsulfuron (N-[[(4,6-dimethoxy-2-pyrimidinyl)amino]-carbonyl]-1-methyl-4-(2-methyl-2H-tetrazol-5-yl)-1H-pyrazole-5-sulfonamide),
bensulfuron-methyl (methyl 2-[[[[[(4,6-dimethoxy-2-pyrimidinyl)amino]carbonyl]amino]-sulfonyl]methyl]benzoate),
chlorimuron-ethyl (ethyl 2-[[[[(4-chloro-6-methoxy-2-pyrimidinyl)amino]carbonyl]amino]sulfonyl]benzoate),
chlorsulfuron (2-chloro-N-[[(4-methoxy-6-methyl-1,3,5-triazin-2-yl)amino]carbonyl]benzenesulfonamide),
cinosulfuron (N-[[(4,6-dimethoxy-1,3,5-triazin-2-yl)amino]carbonyl]-2-(2-methoxyethoxy)-benzenesulfonamide),
cyclosulfamuron (N-[[[2-(cyclopropylcarbonyl)phenyl]amino]-sulfonyl]-$N^1$-(4,6-dimethoxypyrimidin-2-yl)urea),
ethametsulfuron-methyl (methyl 2-[[[[[4-ethoxy-6-(methylamino)-1,3,5-triazin-2-yl]amino]carbonyl]amino]-sulfonyl]benzoate),
ethoxysulfuron (2-ethoxyphenyl [[(4,6-dimethoxy-2-pyrimidinyl)-amino]carbonyl]sulfamate),
flazasulfuron (N-[[(4,6-dimethoxy-2-pyrimidinyl)amino]carbonyl]-3-(trifluoromethyl)-2-pyridinesulfonamide),
flucetosulfuron (1-[3-[[[[(4,6-dimethoxy-2-pyrimidinyl)-amino]carbonyl]amino]sulfonyl]-2-pyridinyl]-2-fluoropropyl methoxyacetate),
flupyrsulfuron-methyl ((methyl 2-[[[[(4,6-dimethoxy-2-pyrimidinyl)amino]carbonyl]amino]sulfonyl]-6-(trifluoromethyl)-3-pyridinecarboxylate),
foramsulfuron (2-[[[[(4,6-dimethoxy-2-pyrimidinyl)amino]carbonyl]amino]sulfonyl]-4-(formylamino)-N,N-dimethylbenzamide),
halosulfuron-methyl (methyl 3-chloro-5-[[[[(4,6-dimethoxy-2-pyrimidinyl)amino]carbonyl]amino]sulfonyl]-1-methyl-1H-pyrazole-4-carboxylate),
imazosulfuron (2-chloro-N-[[(4,6-dimethoxy-2-pyrimidinyl)amino]-carbonyl]imidazo[1,2-a]pyridine-3-sulfonamide),
iodosulfuron-methyl (methyl 4-iodo-2-[[[[(4-methoxy-6-methyl-1,3,5-triazin-2-yl)amino]carbonyl]amino]sulfonyl]benzoate),
iofensulfuron (2-iodo-N-[[(4-methoxy-6-methyl-1,3,5-triazin-2-yl)amino]carbonyl]benzenesulfonamide),
mesosulfuron-methyl (methyl 2-[[[[(4,6-dimethoxy-2-pyrimidinyl)amino]carbonyl]amino]-sulfonyl]-4-[[(methylsulfony)amino]methyl]benzoate),
metazosulfuron (3-chloro-4-(5,6-dihydro-5-methyl-1,4,2-dioxazin-3-yl)-N-[[(4,6-dimethoxy-2-pyrimidinyl)amino]carbonyl]-1-methyl-1H-pyrazole-5-sulfonamide),
metsulfuron-methyl (methyl 2-[[[[(4-methoxy-6-methyl-1,3,5-triazin-2-yl)amino]carbonyl]amino]sulfonyl]benzoate),
nicosulfuron (2-[[[[(4,6-dimethoxy-2-pyrimidinyl)amino]carbonyl]amino]sulfonyl]-N,N-dimethyl-3-pyridinecarboxamide),
orthosulfamuron (2-[[[[[(4,6-dimethoxy-2-pyrimidinyl)amino]carbonyl]amino]sulfonyl]amino]-N,N-dimethylbenzamide),
oxasulfuron (3-oxetanyl 2-[[[[(4,6-dimethyl-2-pyrimidinyl)amino]carbonyl]amino]sulfonyl]benzoate),
primisulfuron-methyl (methyl 2-[[[[[4,6-bis(trifluoromethyl)-2-pyrimidinyl]amino]carbonyl]amino]sulfonyl]benzoate),
prosulfuron (N-[[(4-methoxy-6-methyl-1,3,5-triazin-2-yl)amino]carbonyl]-2-(3,3,3-trifluoropropyl)benzenesulfonamide),
pyrazosulfuron-ethyl (ethyl 5-[[[[(4,6-dimethoxy-2-pyrimidinyl)amino]carbonyl]amino]sulfonyl]-1-methyl-1H-pyrazole-4-carboxylate),
rimsulfuron (N-[[(4,6-dimethoxy-2-pyrimidinyl)amino]carbonyl]-3-(ethylsulfonyl)-2-pyridinesulfonamide), sulfometuron-methyl (methyl 2-[[[[(4,6-dimethyl-2-pyrimidinyl)amino]carbonyl]amino]sulfonyl]-benzoate), sulfosulfuron (N-[[(4,6-dimethoxy-2-pyrimidinyl)amino]carbonyl]-2-(ethylsulfonyl)imidazo[1,2-a]pyridine-3-sulfonamide), thifensulfuron-methyl (methyl 3-[[[[(4-methoxy-6-methyl-1,3,5-triazin-2-yl)amino]carbonyl]amino]sulfonyl]-2-thiophenecarboxylate), triasulfuron (2-(2-chloroethoxy)-N-[[(4-methoxy-6-methyl-1,3,5-triazin-2-yl)amino]carbonyl]benzenesulfonamide), tribenuron-methyl (methyl 2-[[[[N-(4-methoxy-6-methyl-1,3,5-triazin-2-yl)-N-methylamino]carbonyl∇amino]-sulfonyl]benzoate), trifloxysulfuron (N-[[(4,6-dimethoxy-2-pyrimidinyl)amino]carbonyl]-3-(2,2,2-trifluoroethoxy)-2-pyridinesulfonamide), triflusulfuron-methyl (methyl 2-[[[[[4-dimethylamino)-6-(2,2,2-trifluoroethoxy)-1,3,5-triazin-2-yl]amino]carbonyl]amino]-sulfonyl]-3-methylbenzoate) and tritosulfuron (N-[[[4-methoxy-6-(trifluoromethyl)-1,3,5-triazin-2-yl]amino]carbonyl]-2-(trifluoromethyl)benzenesulfonamide).

Other sulfonylureas (e.g. propyrisulfuron: 2-chloro-N-[[(4,6-dimethoxy-2-pyrimidinyl)amino]carbonyl]-6-propylimidazo[1,2-b]pyridazine-3-sulfonamide) that are mentioned in the art (e.g. WO 2014/018410 A1 (Dow Agrosciences; WO 2012/175899 A1 (Syngenta Ltd.)) can also be used for this invention.

Preferred salts of the sulfonylureas mentioned above include the sodium salt thereof and the potassium salt thereof.

The sulfonylurea is preferably comprised in the liquid compositions of the invention in an amount of at least 0.1 wt. % based on the total weight of the liquid composition. More preferably, the sulfonylurea is comprised in an amount of at least 0.2 wt. %, at least 0.5 wt. %, at least 0.7 wt. %, at least 1 wt. %, at least 2 wt. %, at least 5 wt. % or at least 7 wt. %. The sulfonylurea is preferably comprised in the composition in an amount of 60 wt. % or less. More preferably, the sulfonylurea is comprised in an amount of 50 wt. % or less, 40 wt. % or less, 30 wt. % or less, 25 wt. % or less, 20 wt. % or less, 10 wt. % or less, 5 wt. % or less, 2 wt. % or less, or 1 wt. % or less. Any of the preferred lower wt. % limits for the amount of sulfonylurea can be combined with any of the preferred upper wt. % limits to define further suitable wt. % ranges for the present invention. As an example, further exemplary ranges for the amount of sulfonylurea in the liquid composition include 0.1 to 60 wt. %, 1 to 50 wt. %, 2 to 40 wt. %, 5 to 30 wt. %, 0.5 to 20 wt. %, 7 to 30 wt. %, 5 to 10 wt. %, 0.2 to 5 wt. %, 0.5 to 2 wt. % and 0.5 to 1 wt. %.

When the sulfonylurea is used in a modified form such as its salt, ester or otherwise then the wt. % amounts that are described herein refer to the weight amount of the modified sulfonylurea. When more than one sulfonylurea is present in the composition (as the salt, ester or otherwise), then the amounts described herein refer to the sum amount of all the sulfonylureas present in the composition.

When the liquid composition is an oil dispersion of a sulfonylurea, then it is preferable that the sulfonylurea has a particle size (D50) of at least 100 nm or more, at least 200 nm or more, at least 500 nm or more, at least 1 µm or more, at least 2 µm or more, or at least 3 µm or more as a particle size less than this can generate excess heat during milling and possibly degrade the sulfonylurea. Preferably, the sulfonylurea has a particle size (D50) of 30 µm or less, 15 µm or less, 10 µm or less, 7 µm or less, 5 µm or less, 3 µm or less, 1 µm or less, 500 nm or less. Any of the preferred lower limits for the sulfonylurea particle size can be combined with any of the preferred upper limits to define further suitable particle size ranges for the present invention. As an example, further exemplary ranges for the particle size (D50) of the sulfonylurea include 0.1-30 µm, 0.2-15 µm, 0.5-10 µm, 0.1-0.5 µM, 0.2-1 µm, 0.5-3 µm, 1-15 µm, 1-10 µm, 1-7 µm, 2-15 µm, 2-10 µm, 2-7 µm, 3-15 µm, 3-10 µm, and 3-7 µm. D50 refers to the volume median particle size and can be determined by laser light scattering using the method described in CIPAC MT187.

The liquid composition of the invention may comprise more than one sulfonylurea herbicide compound. The liquid composition may comprise any combination of sulfonylureas as disclosed herein. For example, the liquid composition may comprise tribenuron-methyl and any other sulfonylurea described herein; the liquid composition may comprise metsulfuron-methyl and any other sulfonylurea described herein; or the liquid composition may comprise nicosulfuron and any other sulfonylurea described herein. Further exemplary combinations of sulfonylureas for use in the present invention include: nicosulfuron and rimsulfuron; nicosulfuron and thifensulfuron methyl; nicosulfuron and prosulfuron; metsulfuron methyl and iodosulfuron methyl (optionally as the sodium salt); metsulfuron methyl and sulfosulfuron; metsulfuron methyl and thifensulfuron methyl; metsulfuron methyl and bensulfuron methyl; metsulfuron methyl and chlorsulfuron; metsulfuron methyl and chlorimuron ethyl; metsulfuron methyl and tribenuron-methyl; tribenuron-methyl and bensulfuron-methyl; tribenuron-methyl and thifensulfuron methyl; metsulfuron methyl, tribenuron-methyl and thifensulfuron methyl; tribenuron-methyl and chlorimuron ethyl; tribenuron-methyl and mesosulfuron (optionally as mesosulfuron methyl); tribenuron-methyl and iodosulfuron-methyl (optionally as the sodium salt); iodosulfuron methyl (optionally as the sodium salt) and mesosulfuron; iodosulfuron methyl (optionally as the sodium salt) and mesosulfuron methyl; iodosulfuron methyl (optionally as the sodium salt) and amidosulfuron; iodosulfuron methyl (optionally as the sodium salt) and foramsulfuron; mesosulfuron (and/or as the methyl ester) and iodosulfuron methyl; foramsulfuron and iodosulfuron-methyl (optionally as the sodium salt); rimsulfuron and thifensulfuron; bensulfuron-methyl and thifensulfuron-methyl; thifensulfuron-methyl and chlorimuron-ethyl.

In one aspect of the invention the liquid herbicidal composition comprises at least one sulfonylurea that is not a pyridylsulfonylurea. In another aspect of the invention the herbicidal composition does not comprise a pyridylsulfonylurea. In one further aspect of the invention the herbicidal composition does not comprise nicosulfuron.

4.4 Inorganic Salt

The composition of the present invention comprises at least one inorganic salt selected from the metal phosphates and the metal carbonates. Exemplary metal salts include those derived from the alkali metals such as lithium, sodium and potassium, the alkaline earth metals such as magnesium and calcium, as well as those derived from other metals such as aluminium. Preferred salts for the present invention include sodium phosphate and sodium carbonate in their various forms. Exemplary salts include $Na_3PO_4$, $Na_2CO_3$, $AlPO_4$, $Mg_3(PO_4)_2$ and $Na_2HPO_4$. Both the anhydrous and hydrated forms of the metal salts can be used but the anhydrous form is most preferred in view of improving chemical stability of the sulfonylurea.

It is to be understood that the term "sodium phosphate" and the term "potassium phosphate" includes the various forms of sodium phosphate and potassium phosphate, respectively, as well as all anhydrous and hydrated forms thereof. For example, "sodium phosphate" includes monosodium phosphate (anhydrous), monosodium phosphate (monohydrate), monosodium phosphate (dihydrate), disodium phosphate (anhydrous), disodium phosphate (dihydrate), disodium phosphate (heptahydrate), disodium phosphate (octahydrate), disodium phosphate (dodecahydrate), trisodium phosphate (anhydrous, hexagonal), trisodium phosphate (anhydrous, cubic), trisodium phosphate (hemihydrate), trisodium phosphate (hexahydrate), trisodium phosphate (octahydrate), trisodium phosphate (dodecahydrate), monosodium diphosphate (anhydrous), disodium diphosphate (anhydrous), disodium diphosphate (hexahydrate), trisodium diphosphate (anhydrous), trisodium diphosphate (hydrate), trisodium diphosphate nonahydrate, tetrasodium phosphate (anhydrous), tetrasodium diphosphate (decahydrate), sodium triphosphate, and sodium tetraphospate. The term "potassium phosphate" includes monopotassium phosphate, dipotassium phosphate and tripotassium phosphate, including the anhydrous forms thereof.

Surprisingly, trisodium phosphate and tripotassium phosphate provide for a sulfonylurea with superior chemical stability than many of the other salts mentioned herein, particularly with respect to those sulfonylureas that are more prone to hydrolysis in liquid compositions. For example, tribenuron-methyl was found to have excellent chemical stability in the presence of trisodium phosphate. Accordingly, trisodium phosphate (in its anhydrous or hydrated forms) is particularly preferred as the inorganic salt of the invention.

Superior chemical stability has also been observed where:
the sulfonyl urea is one or more selected from tribenuron-methyl, metsulfuron-methyl, nicosulfuron, bensulfuron-methyl, foramsulfuron, pyrazosulfuron-ethyl, chlorsulfuron, amidosulfuron, and triasulfuron, and the salt is $Na_3PO_4$; or
the sulfonyl urea is one or more selected from tribenuron-methyl and nicosulfuron and the salt is $Na_2CO_3$; or
the sulfonyl urea is one or more selected from rimsulfuron, bensulfuron-methyl, mesosulfuron-methyl, thifensulfuron-methyl, chlorimuron-ethyl, and triasulfuron, and the salt is $Mg_3(PO_4)_2$; or
the sulfonyl urea is one or more selected from metsulfuron-methyl, rimsulfuron and halosulfuron-methyl and the salt is $AlPO_4$.

Accordingly, the invention also relates to formulations, as described herein, comprising the above preferred combination of salt and sulfonylurea. The invention also relates to the use of $Na_3PO_4$ to improve chemical stabilisation of tribenuron-methyl, metsulfuron-methyl, nicosulfuron, bensulfuron-methyl, foramsulfuron, pyrazosulfuron-ethyl, chlorsulfuron, amidosulfuron, or triasulfuron in all such formulations; or the use of $Na_2CO_3$ to improve chemical stabilisation of tribenuron-methyl or nicosulfuron in all such formulations; or the use of $Mg_3(PO_4)_2$ to improve chemical stabilisation of rimsulfuron, bensulfuron-methyl, mesosulfuron-methyl, thifensulfuron-methyl, chlorimuron-ethyl, or triasulfuron in all such formulations; or the use of $AlPO_4$ to improve chemical stabilisation of metsulfuron-methyl, rimsulfuron or halosulfuron-methyl in all such formulations.

In terms of improving chemical stability of the sulfonylurea, the inorganic salt is preferably comprised in the liquid composition of the invention in an amount of at least 0.01 wt. % based on the total weight of the liquid composition. More preferably, the inorganic salt is comprised in an amount of at least 0.03 wt. %, at least 0.05 wt. %, at least 0.1 wt. %, at least 0.2 wt. %, at least 0.5 wt. %, at least 1 wt. %, at least 2 wt. %. The inorganic salt is preferably comprised in the composition in an amount of 30 wt. % or less to reduce physical stability problems of the formulation and to reduce interference with the function of any surfactants that are optionally present. More preferably, the inorganic salt is comprised in an amount of 25 wt. % or less, 20 wt. % or less, 15 wt. % or less, 10 wt. % or less, 8 wt. % or less, 6 wt. % or less, 5 wt. % or less, 2 wt. % or less, 1 wt. % or less, or 0.7 wt. % or less. Any of the preferred lower wt. % limits for the amount of inorganic salt can be combined with any of the preferred upper wt. % limits to define further suitable wt. % ranges for the present invention. As an example, further exemplary ranges for the amount of inorganic salt in the liquid composition include 0.01 to 30 wt. %, 0.1 to 25 wt. %, 1 to 20 wt. %, 1 to 10 wt. %, 0.5 to 10 wt. %, 1 to 5 wt. %, 0.5 to 5 wt. %, 0.1 to 2 wt. %, 0.2 to 2 wt. %, 0.2 to 1 wt. %, and 0.2 to 0.7 wt. %.

The weight ranges above refer to the total amount of inorganic salt selected from the metal phosphates and metal carbonates that is present in the liquid compositions. The weight ranges above do not refer to other salts that might be present in the composition such as the salt of a sulfonylurea. When more than one inorganic salt selected from the metal phosphates and metal carbonates is present in the composition (e.g. $Na_2CO_3$ and $Na_3PO_4$), then the amounts described herein refer to the sum amount of all the inorganic salts selected from the metal phosphates and metal carbonates that are present in the composition.

In terms of improving chemical stability, it is preferable that the weight ratio of the inorganic salt to sulfonylurea is 0.1 or greater. Preferably, the weight ratio of the inorganic salt to sulfonylurea is 0.2 or greater, 0.3 or greater, 0.5 or greater, 0.7 or greater, or 1 or greater. The weight ratio of the inorganic salt to sulfonylurea is preferably 5 or less, 4 or less, 3 or less, 2 or less, or 1 or less. The preferred weight ratios refer to the total amount of the inorganic salt selected from the metal phosphates and metal carbonates to the total amount of sulfonylurea compounds in the liquid composition. Any of the preferred lower weight ratio limits can be combined with any of the preferred upper weight ratio limits to define further suitable weight ratio ranges for the present invention. As an example, further exemplary ranges for the weight ratio of the inorganic salt to sulfonylurea include 0.1 to 5, 0.2 to 4, 0.3 to 3, 0.3 to 1, 0.5 to 2, 0.7 to 2, 0.1 to 2, 1 to 2 and 1 to 5.

In one embodiment of the invention the liquid herbicidal composition comprises:
a non-aqueous solvent system;
at least one sulfonylurea herbicide, wherein the total amount of sulfonylurea compounds is 1 to 50 wt. % of the composition; and
at least one inorganic salt selected from the metal carbonates and metal phosphates, wherein the total amount of inorganic salt selected from the metal carbonates and metal phosphates is 0.1 to 20 wt. %;
with the proviso that the weight ratio of inorganic salt selected from the metal phosphates and metal carbonates to sulfonylurea is in the range of from 0.1 to 5.

In a preferred embodiment of the invention the total amount of sulfonylurea compounds is 2 to 20 wt. %, the total amount of inorganic salt selected from the metal carbonates and metal phosphates is 1 to 20 wt. %, and the weight ratio of inorganic salt to sulfonylurea is in the range of from 0.1 to 5.

In a preferred embodiment of the invention the total amount of sulfonylurea compounds is 2 to 20 wt. %, the total amount of inorganic salt selected from the metal carbonates and metal phosphates is 1 to 20 wt. %, and the weight ratio of inorganic salt to sulfonylurea is in the range of from 0.5 to 2.5, preferably 0.7 to 2.3.

In any of the embodiments above, if the salt includes $Na_2CO_3$ (anhydrous or hydrated) then the weight ratio of $Na_2CO_3$ to sulfonylurea is preferably in the range of from 0.1 to 2, more preferably in the range of from 0.1 to 1. If the salt includes $Na_3PO_4$ (anhydrous or hydrated) then the weight ratio $Na_3PO_4$ to sulfonylurea is preferably in the range of from 0.1 to 2, more preferably in the range of from 0.5 to 2, and most preferably in the range of from 1 to 2. If the salt includes $K_3PO_4$ (anhydrous or hydrated) then the weight ratio $K_3PO_4$ to sulfonylurea is preferably in the range of from 0.1 to 2, more preferably in the range of from 0.5 to 2, and most preferably in the range of from 1 to 2.

It has also been found that maintaining the particle size of the inorganic salt within a defined range provides benefits in terms of improved chemical stability of the sulfonylurea. The particle size (D50) of the inorganic salt is preferably at least 100 nm or more, at least 200 nm or more, at least 500 nm or more, at least 1 µm or more, at least 1.5 µm or more, or at least 2 µm or more. The particle size (D50) of the inorganic salt is preferably 30 µm or less, 15 µm or less, 10 µm or less, 5 µm or less, 3 µm or less, 1 µm or less, or 500 nm or less to improve chemical stability of the sulfonylurea in the composition. Any of the preferred lower limits for the inorganic salt particle size can be combined with any of the preferred upper limits to define further suitable salt particle size ranges for the present invention. As an example, further exemplary ranges for the particle size of the inorganic salt include 0.1-30 µm, 0.2-15 µm, 0.5-10 µm, 0.1-0.5 µm, 0.2-1 µm, 0.5-3 µm, 1-15 µm, 1-10 µm, 1-5 µm, 1-3 µm, 1.5-15 µm, 2-15 µm, 2-10 µm, 2-5 µm, and 2-3 µm. D50 refers to the volume median particle size and can be determined by laser light scattering using the method described in CIPAC MT187.

In one aspect of the invention, the liquid composition comprises at least one inorganic salt selected from the metal carbonates and metal phosphates that is not calcium carbonate or sodium triphosphate. In a further aspect of the invention the liquid composition does not comprise calcium carbonate or sodium triphosphate. In still a further aspect of the invention, if the liquid composition comprises a pyridylsulfonylurea, then the composition does not comprise calcium carbonate or sodium triphosphate. In a further aspect still, if the liquid composition comprises a pyridylsulfonylurea, then the composition does not comprise alkali metal bicarbonates, $Na_2CO_3$ or $K_2CO_3$. In still a further aspect of the invention, if the liquid composition comprises nicosulfuron, then the composition does not comprise one or more of calcium carbonate, sodium triphosphate, and alkali metal bicarbonates, $Na_2CO_3$ or $K_2CO_3$.

4.5 Non-Aqueous Solvent

The composition of the present invention comprises a non-aqueous solvent system. The term "non-aqueous solvent system" means that one or more solvents other than water (e.g. organic solvents) are used as the liquid carrier in the liquid composition. This does not mean to say that the solvent system must necessarily be completely free of water. Trace amounts of water may be present in the components that are used to prepare the non-aqueous solvent system. For instance, trace amounts of water may be introduced into the solvent system by organic solvents, surfactants or salts that are used to prepare the liquid herbicidal composition. While the term "non-aqueous solvent system" is clear in this technical field (e.g. ODs, ECs and SLs employ a non-aqueous solvent system), for the avoidance of any doubt the term can be taken to mean that the liquid composition comprises water in an amount of 5 wt. % or less of the composition, preferably 3 wt. % or less, more preferably 2 wt. % and most preferably 1 wt. % or less.

The sulfonylurea and inorganic salt are dissolved, dispersed, suspended or otherwise contained in the non-aqueous solvent system. Typical solvents are described in Marsden, Solvents Guide, 2nd Ed., Interscience, New York, 1950. The non-aqueous solvent system preferably contains one or more aprotic organic solvents as the major constituent of the solvent system. When the amount of aprotic solvent in the solvent system is 50 wt. % or more, the ability of the inorganic salt to chemically stabilise the sulfonylurea is greatly improved. Preferably, the one or more aprotic solvents make up 60 wt. % or more, 70 wt. % or more, 80 wt. % or more and most preferably 90 wt. % or more of the solvent system. Suitable aprotic organic solvents for use in the present invention include, for example, those listed under "Component (C)" in US 2005/0113254 (Bayer CropScience GmbH):

(1) hydrocarbons, which may be unsubstituted or substituted, for example
  (1a) aromatic hydrocarbons, for example mono- or polyalkyl-substituted benzenes, such as toluene, xylenes, mesitylene, ethylbenzene, or mono- or polyalkyl-substituted naphthalenes, such as 1-methylnaphthalene, 2-methylnaphthalene or dimethylnaphthalene, or other benzene-derived aromatic hydrocarbons, such as indane or Tetralin®, or mixtures thereof,
  (1b) aliphatic hydrocarbons, for example straight-chain or branched aliphatics, for example of the formula $C_nH_{2n+2}$, such as pentane, hexane, octane, 2-methylbutane or 2,2,4-trimethylpentane, or cyclic, optionally alkyl-substituted aliphatics, such as cyclohexane or methylcyclopentane, or mixtures thereof, such as solvents of the Exxsol® D series, Isopar® series or Bayol® series, for example Bayol® 82 (ExxonMobil Chemicals), or the Isane® IP series or Hydroseal® G series (TotalFinaElf), as well as straight-chain, branched or cyclic unsaturated aliphatics including terpenes such as turpentine and its constituents (e.g. pinene, camphene) as well as compounds derivable therefrom such as isobornyl acetate (exo-1,7,7-trimethylbicyclo[2.2.1] hept-2-yl acetate),
  (1c) mixtures of aromatic and aliphatic hydrocarbons, such as solvents of the Solvesso® series, for example Solvesso® 100, Solvesso® 150 or Solvesso® 200 (ExxonMobil Chemicals), of the Solvarex®/Solvaro® series (TotalFinaElf) or the Caromax® series, for example Caromax® 28 (Petrochem Carless), or
  (1d) halogenated hydrocarbons, such as halogenated aromatic and aliphatic hydrocarbons, such as chlorobenzene or methylene chloride;

(2) aprotic polar solvents, such as ethers, esters of $C_1$-$C_9$-alkanoic acids which may be mono-, di- or polyfunctional, such as their mono-, di- or triesters, for example with $C_1$-$C_{18}$-alkyl alcohols, ketones with a low tendency to tautomerize, phosphoric acid esters, amides, nitriles or sulfones, for example tris-2-ethylhexyl phosphate, diisobutyl adipate, Rhodiasolv® RPDE (Rhodia), cyclohexanone, Jeffsol® PC (Huntsman), γ-butyrolactone, pyrrolidone-based solvents such as N-methylpyrrolidone or N-butylpyrrolidone, dimethyl sulfoxide, acetonitrile, tributylphosphatam or the Hostarex® PO series (Clariant);

(3) fatty acid esters, for example of natural origin, for example natural oils, such as animal oils or vegetable oils, or of synthetic origin, for example the Edenor® series, for example Edenor® MEPa or Edenor® MESU, or the Agnique® ME series or Agnique® AE series (Cognis), the Salim® ME series (Salim), the Radia® series, for example Radia® 30167 (ICI), the Prilube® series, for example Prilube® 1530 (Petrofina), the Stepan® C series (Stepan) or the Witconol® 23 series (Witco). The fatty acid esters are preferably esters of $C_{10}$-$C_{22}$-, with preference $C_{12}$-$C_{20}$-fatty acids. The $C_{10}$-$C_{22}$-fatty acid esters are, for example, esters of unsaturated or saturated $C_{10}$-$C_{22}$-fatty acids, in particular those having an even number of carbon atoms, for example erucic acid, lauric acid, palmitic acid, and in particular $C_{18}$-fatty acids, such as stearic acid, oleic acid, linoleic acid or linolenic acid.

Examples of fatty acid esters such as $C_{10}$-$C_{22}$-fatty acid esters are glycerol and glycol esters of fatty acids such as $C_{10}$-$C_{22}$-fatty acids, or transesterification products thereof, for example fatty acid alkyl esters such as $C_{10}$-$C_{22}$-fatty acid $C_1$-$C_{20}$-alkyl esters, which can be obtained, for example, by transesterification of the abovementioned glycerol or glycol fatty acid esters such as $C_{10}$-$C_{22}$-fatty acid esters with $C_1$-$C_{20}$-alcohols (for example methanol, ethanol, propanol or butanol). Preferred fatty acid alkyl esters such as $C_{10}$-$C_{22}$-fatty acid $C_1$-$C_{20}$-alkyl esters are methyl esters, ethyl esters, propyl esters, butyl esters, 2-ethylhexyl esters and dodecyl esters. Preferred glycol and glycerol fatty acid esters such as $C_{10}$-$C_{22}$-fatty acid esters are the uniform or mixed glycol esters and glycerol esters of $C_{10}$-$C_{22}$-fatty acids, in particular of such fatty acids having an even number of carbon atoms, for example crude acid, lauric acid, palmitic acid and in particular $C_{18}$-fatty acids such as stearic acid, oleic acid, linoleic acid or linolenic acid.

Animal oils and vegetable oils are generally known and commercially available. For the purpose of the present invention, the term "animal oils" is to be understood as meaning oils of animal origin such as whale oil, cod-liver oil, musk oil or mink oil, and the term "vegetable oils" is to be understood as meaning oils of oleaginous plant species, such as soybean oil, rapeseed oil, corn oil, sunflower oil, cottonseed oil, linseed oil, coconut oil, palm oil, thistle oil, walnut oil, arachis oil, olive oil or castor oil, in particular rapeseed oil, where the vegetable oils also include their transesterification products, for example alkyl esters, such as rapeseed oil methyl ester or rapeseed oil ethyl ester.

The vegetable oils are preferably esters of $C_{10}$-$C_{22}$-fatty acids, preferably $C_{12}$-$C_{20}$-fatty acids. The $C_{10}$-$C_{22}$-fatty acid esters are, for example, esters of unsaturated or saturated $C_{10}$-$C_{22}$-fatty acids having, in particular, an even number of carbon atoms, for example erucic acid, lauric acid, palmitic acid and in particular $C_{18}$-fatty acids such as stearic acid, oleic acid, linoleic acid or linolenic acid. Examples of vegetable oils are $C_{10}$-$C_{22}$-fatty acid esters of glycerol or glycol with $C_{10}$-$C_{22}$-fatty acids, or $C_{10}$-$C_{22}$-fatty acid $C_1$-$C_{20}$-alkyl esters which can be obtained, for example, by transesterification of the glycerol or glycol $C_{10}$-$C_{22}$-fatty acid esters mentioned above with $C_1$-$C_{20}$-alcohols (for example methanol, ethanol, propanol or butanol). The vegetable oils can be contained in the mixtures for example in the form of commercially available vegetable oils, in particular rapeseed oils, such as rapeseed oil methyl ester, for example Phytorob® B (Novance, France), Edenor® MESU and the Agnique® ME series (Cognis, Germany) the Radia® series (ICI the Prilube® series (Petrofina), or biodiesel or in the form of commercially available plant-oil-containing formulation additives, in particular those based on rapeseed oils, such as rapeseed oil methyl esters, for example Hasten® (Victoria Chemical Company, Australia), Actirob® B (Novance, France), Rako-Binol® (Bayer AG, Germany), Renol® (Stefes, Germany) or Mero® (Stefes, Germany).

Examples of synthetic acid esters are, for example, those derived from fatty acids having an odd number of carbon atoms, such as $C_{11}$-$C_{21}$-fatty acid esters.

Preferred organic solvents are hydrocarbons, in particular aromatic hydrocarbons and/or aliphatic hydrocarbons and fatty acid esters, such as vegetable oils, such as triglycerides of fatty acids having 10 to 22 carbon atoms, which may be saturated or else unsaturated, straight-chain or branched and which may or may not carry further functional groups, such as corn oil, rapeseed oil, sunflower oil, cottonseed oil, linseed oil, soybean oil, coconut oil, palm oil, thistle oil or castor oil, and their trans-esterification products, such as fatty acid alkyl esters, and mixtures thereof.

Preferred solvents for use in the present invention include: linear or branched C6 to C30 paraffin oils, for example hexane, heptane, octane, nonane, decane, undecane, dodecane, tridecane, tetradecane, pentadecane, hexadecane, their mixtures, or mixtures thereof with higher boiling homologs, such as hepta-, octa-, nona-decane, eicosane, heneicosane, docosane, tricosane, tetracosane, pentacosane, and the branched chain isomers thereof; aromatic or cycloaliphatic solvents, which may be unsubstituted or substituted, C7- to C18-hydrocarbon compounds such as mono- or polyalkyl-substituted benzenes, or mono- or polyalkyl-substituted naphthalenes; vegetable oils such as liquid triglycerides, for example olive oil, kapok oil, castor oil, papaya oil, camellia oil, palm oil, sesame oil, corn oil, rice bran oil, peanut oil, walnut oil, coconut oil, cotton seed oil, soybean oil, rapeseed oil, linseed oil, tung oil, sunflower oil, safflower oil, or also transesterification products thereof, e.g. alkyl esters, such as rapeseed oil methyl ester or rapeseed oil ethyl ester; animal oil, such as whale oil, cod-liver oil, or mink oil; liquid esters of C1 to C12 monoalcohols or polyols, for example butanol, n-octanol, i-octanol, dodecanol, cyclopentanol, cyclohexanol, cyclooctanol, ethylene glycol, propylene glycol or benzyl alcohol, with C2 to C10 carboxylic or polycarboxylic acids, such as caproic acid, capric acid, caprylic acid, pelargonic acid, succinic acid and glutaric acid; or with aromatic carboxylic acids such as benzoic acid, toluic acid, salicylic acid and phthalic acid. Esters which can be used in the composition of the invention are thus, for example, benzyl acetate, caproic acid ethyl ester, isobornyl acetate, pelargonic acid ethyl ester, benzoic acid methyl or ethyl ester, salicylic acid methyl, propyl, or butyl ester, diesters of phthalic acid with saturated aliphatic or alicyclic C1 to C12 alcohols, such as phthalic acid dimethyl ester, dibutyl ester, diisooctyl ester; liquid amides of C1-C3 amines, alkylamines or alkanolamines with C6 to C18 carboxylic acids; or mixtures thereof.

The non-aqueous solvent system is present in an amount such that it can act as a liquid carrier for the other components that are present in the composition. Preferably, the non-aqueous solvent system comprises an organic solvent in an amount of at least 5 wt. % based on the weight of the composition. A low amount of organic solvent is possible when other components in the composition are also liquids (e.g. liquid herbicide and/or liquid emulsifier). More preferably, the non-aqueous solvent system comprises an organic solvent in an amount of at least 10 wt. %, at least 15 wt. %, at least 20 wt %, at least 25 wt %, at least 30 wt. %, or at least 40 wt. % of the composition. Preferably the non-aqueous solvent system comprises an organic solvent in an amount of 95 wt. % or less of the composition. More preferably the non-aqueous solvent system comprises an organic solvent in an amount of 90 wt. % or less, 85 wt. % or less, 80 wt. % or less, 75 wt. % or less, or 60 wt. % or less of the composition. Any of the disclosed wt. % lower limits for the amount of the organic solvent in the non-aqueous solvent system can be combined with any of the disclosed wt. % upper limits to define further suitable wt. % ranges for the purpose of this invention. As an example, exemplary ranges for the amount of the organic solvent in the composition include 5 to 95 wt. %, 10 to 90 wt. %, 20 to 80 wt. %, 30 to 60 wt. %, 40 to 60 wt. %, 10 to 75 wt. % and 20 to 60 wt. %.

When more than one organic solvent is present in the composition then the amounts described herein refer to the sum amount of all the organic solvents present in the composition.

The total amount of protic organic solvent such as alcohols, amines and carboxylic acids is preferably kept to 20 wt. % or less based on the weight of the liquid composition. More preferably, the total amount of protic organic solvent is 15 wt. % or less, 10 wt. % or less, 5 wt. % or less, 2 wt. % or less, or 1 wt. % or less of the composition. When more than one protic solvent is present in the composition then the amounts described herein refer to the sum amount of all the protic solvents present in the composition.

4.6 Additional Active Agents 4.6.1 Non-Sulfonylurea Herbicides

The composition of the present invention may comprise one or more herbicides in addition to the sulfonylurea herbicide(s). These additional non-sulfonylurea herbicides may be liquids, waxy solids or powders and may be dissolved, dispersed, suspended or otherwise contained in the composition. The additional herbicidal compound is not particularly limited and can be any herbicidal compound known in the art. For example, the compound may be selected from the herbicidal compounds listed in the 16$^{th}$ Edition of "*The Pesticide Manual*" (ISBN-10: 190139686X) and the literature cited therein. Exemplary additional herbicidal compounds include:

2,4-D (e.g. ester or amine), 2,4-DB, 2,3,6-TBA, acetochlor, acifluorfen, acifluorfen-sodium, aclonifen, alachlor, alloxydim, alloxydim-sodium, ametryn, amicarbazone, aminopyralid, amitrole, anilofos, asulam, atrazine, azafenidin, beflubutamid, benazolin,-benazolin-ethyl, benfuresate, bentazone, benzfendizone, benzobicyclon, benzofenap, bifenox, bilanafos, bispyribac-sodium, bromacil, bromobutide, bromofenoxim, bromoxynil, butachlor, butafenacil, butenachlor, butralin, butroxydim, butylate, cafenstrole, carbetamide, carfentrazone-ethyl, chlomethoxyfen, chloridazon, chlornitrofen, chlorotoluron, cinidon-ethyl, cinmethylin, clefoxydim, clethodim, clodinafop-propargyl, clomazone, clomeprop, clopyralid, cloransulam-ethyl, cumyluron, cyanazine, cycloxydim, cyhalofop-butyl, daimuron, dazomet, desmedipham, dicamba, dichlobenil, dichlorprop, dichlorprop-P, diclofop-methyl, diclosulam, difenzoquat, diflufenican, diflufenzopyr, dikegulac-sodium, dimefuron, dimepiperate, dimethachlor, dimethametryn, dimethenamid, diquat-dibromide, dithiopyr, diuron, dymron, EPTC, esprocarb, ethalfluralin, ethofumesate, ethoxyfen, etobenzanid, fenoxaprop-ethyl, fenoxaprop-P-ethyl, fentrazamide, flamprop-M-isopropyl, flamprop-M-methyl, florasulam, fluazifop, fluazifop-butyl, fluazolate, flucarbazone-sodium, fluchloralin, flufenacet, flufenpyr, flumetsulam, flumiclorac-pentyl, flumioxazin, fluometuron, fluorochloridone, fluoroglycofen-ethyl, flupoxam, fluridone, fluroxypyr, fluroxypyr-butoxypropyl, fluroxypyr-meptyl, flurprimidol, flurtamone, fluthiacet-methyl, fomesafen, glufosinate, glufosinate-ammonium, glyphosate, haloxyfop, haloxyfop-ethoxyethyl, haloxyfop-methyl, haloxyfop-P-methyl, hexazinone, imazamethabenz-methyl, imazamox, imazapic, imazapyr, imazaquin, imazethapyr, indanofan, ioxynil, isoproturon, isouron, isoxaben, isoxachlortole, isoxaflutole, ketospiradox, lactofen, lenacil, linuron, MCPA, MCPB, mecoprop, mecoprop-P, mefenacet, mesotrione, metamifop, metamitron, metazachlor, methabenzthiazuron, methyldymron, metobromuron, metolachlor, metosulam, metoxuron, metribuzin, molinate, monolinuron, naproanilide, napropamide, neburon, norflurazon, orbencarb, oryzalin, oxadiargyl, oxadiazon, oxaziclomefone, oxyfluorfen, paraquat, pelargonic acid, pendimethalin, pendralin, penoxsulam, pentoxazone, pethoxamid, phenmedipham, picloram, picolinafen, pinoxaden, piperophos, pretilachlor, profluazol, profoxydim, prometryn, propachlor, propanil, propaquizafop, propisochlor, propoxycarbazone-sodium, propyzamide, prosulfocarb, pyraclonil, pyraflufen-ethyl, pyrazolate, pyrazoxyfen, pyribenzoxim, pyributicarb, pyridafol, pyridate, pyriftalid, pyriminobac-methyl, pyrithiobac-sodium, quinclorac, quinmerac, quinoclamine, quizalofop-ethyl, quizalofop-P-ethyl, quizalofop-P-tefuryl, sethoxydim, simazine, simetryn, S-metolachlor, sulcotrione, sulfentrazone, sulfosate, tebuthiuron, tepraloxydim, terbuthylazine, terbutryn, thenylchlor, thiazopyr, thiobencarb, tiocarbazil, tralkoxydim, triallate, triaziflam, triclopyr, tridiphane, and trifluralin.

The additional non-sulfonylurea herbicide is preferably comprised in the liquid composition of the invention in an amount of at least 0.1 wt. %. More preferably, the non-sulfonylurea herbicide is comprised in an amount of at least 0.2 wt. %, at least 0.5 wt. %, at least 0.7 wt. %, at least 1 wt. %, at least 2 wt. %, at least 5 wt. %, at least 10 wt. %, at least 15 wt. %, at least 20 wt. % or at least 25 wt. %. The non-sulfonylurea herbicide is preferably comprised in the composition an amount of 95 wt. % or less. A large amount of non-sulfonylurea herbicide is possible when the non-sulfonylurea herbicide is itself a liquid. More preferably, the non-sulfonylurea herbicide is comprised in an amount of 60 wt. % or less, 50 wt. % or less, 40 wt. % or less, 35 wt. % or less, 30 wt. % or less or 25 wt. % or less. Any of the disclosed wt. % lower limits for the amount of non-sulfonylurea herbicide can be combined with any of the disclosed wt. % upper limits to define further suitable wt. % ranges for the purposes of this invention. As an example, further exemplary ranges for the amount of non-sulfonylurea herbicide in the liquid composition include 0.1 to 95 wt. %, 1 to 60 wt. %, 2 to 50 wt. %, 5 to 40 wt. %, 10 to 30 wt. %, 15 to 25 wt. %, 25 to 35 wt. % and 10 to 50 wt. %.

When a salt or derivative (ester, etc.) of the non-sulfonylurea herbicide is employed for the purposes of this invention then the wt. % amounts that are described herein refer to the weight of the salt or derivative. When more than one non-sulfonylurea herbicide is present in the composition (as a salt, derivative or otherwise), then the amounts described herein refer to the sum amount of all of the non-sulfonylurea herbicides present in the composition.

In the present invention one or more of the non-sulfonylurea herbicides may be partially or wholly encapsulated (e.g. microcapsules) such as is described in WO 2008/061721 A2 (GAT Microencapsulation AG). In such case the wt. % amounts that are described herein refer to the weight of the non-sulfonylurea herbicides without the encapsulating material.

The liquid composition of the invention may comprise any of the sulfonylureas described herein with any of the non-sulfonylurea herbicides described herein.

For example, the liquid composition may comprise tribenuron-methyl and any of the other non-sulfonylurea herbicides described herein. Exemplary combinations with tribenuron-methyl include: tribenuron-methyl and 2,4-D (e.g. as ester or amine or choline salt); tribenuron methyl and MCPA (e.g. as ester or amine); tribenuron-methyl and bromoxynil; tribenuron-methyl and glyphosate; tribenuron-methyl and fluroxypyr; tribenuron-methyl and dicamba (e.g. as the sodium salt or diglycolamine salt or ester); tribenuron-methyl and mecoprop-P; tribenuron-methyl and MCPB; tribenuron-methyl, fluroxypyr and clopyralid; tribenuron-methyl and carfentrazone ethyl; tribenuron-methyl and clopyralid (e.g. as MEA salt); tribenuron-methyl and clodinafop; tribenuron-methyl and quinclorac; tribenuron-methyl and florasulam.

The liquid composition may comprise nicosulfuron and any of the other non-sulfonylurea herbicides described herein. Exemplary combinations with nicosulfuron include: nicosulfuron and dicamba (optionally as the sodium salt or ester); nicosulfuron and atrazine; nicosulfuron and flumetsulam; nicosulfuron and clopyralid (optionally as the potassium salt or ester); nicosulfuron and diflupenzopyr (optionally as the sodium salt or ester); nicosulfuron and metolachlor; nicosulfuron and terbuthylazine; nicosulfuron and mesotrione; and nicosulfuron and bentazone.

The liquid composition may comprise metsulfuron-methyl and any of the other non-sulfonylurea herbicides described herein. Exemplary combinations with metsulfuron-methyl include; metsulfuron-methyl and acetochlor; metsulfuron-methyl and carfentrazone ethyl; metsulfuron-methyl and imazapyr; metsulfuron-methyl and aminopyralid; metsulfuron-methyl and fluroxypyr; metsulfuron-methyl and mecoprop-p; metsulfuron-methyl and picloram; metsulfuron-methyl and pyraflufen ethyl; metsulfuron-methyl and propanil; metsulfuron-methyl and glyphosate-ammonium; metsulfuron-methyl and dicamba (optionally as the sodium, dimethylammonium or diglycolamine salt or as an ester); metsulfuron-methyl and 2,4-D (optionally as the dimethyl-ammonium salt, choline salt, or an ester); and metsulfuron-methyl, dicamba (optionally as the sodium, dimethylammonium or diglycolamine salt or as an ester) and 2,4-D (optionally as the dimethylammonium salt, choline salt, or an ester).

Further exemplary combinations of sulfonylureas and non-sulfonylureas for use in the present invention include: bensulfuron-methyl and acetochlor; bensulfuron-methyl and indanofan; bensulfuron-methyl and clomeprop; bensulfuron-methyl and pretilachlor; bensulfuron-methyl and fentrazamide; bensulfuron-methyl and thenylchlor; bensulfuron-methyl and pentoxazone; bensulfuron-methyl and pyriminobac-methyl; bensulfuron-methyl and bromobutide; bensulfuron-methyl, pentoxazone, pyriminobac-methyl, and bromobutide; bensulfuron-methyl and butachlor; bensulfuron-methyl and daimuron; bensulfuron-methyl and mefenacet; bensulfuron-methyl, daimuron and mefenacet; chlorimuron ethyl and sulfentrazone; iodosulfuron-methyl (optionally as the sodium salt) and isoxadifen-ethyl; iodo-sulfuron-methyl (optionally as the sodium salt) and propoxycarbazone (optionally as the sodium salt); iodosulfuron-methyl (optionally as the sodium salt) and diflufenican; iodosulfuron-methyl (optionally as the sodium salt) and fenoxaprop-P-ethyl; mesosulfuron (and/or as the methyl ester) and diflufenican; mesosulfuron (and/or as the methyl ester) and propoxycarbazone (e.g. sodium salt); pyrasulfuron-ethyl and pretilachlor; pyrasulfuron-ethyl and pyriftalid; pyrasulfuron-ethyl and mefenacet; pyrasulfuron-ethyl and esprocarb; pyrasulfuron-ethyl and dimethametryn; pyrasulfuron-ethyl and oxaziclomefone; pyrasulfuron-ethyl and benzobicyclon; pyrasulfuron-ethyl and cyhalofop-butyl; pyrasulfuron-ethyl and penoxsulam; pyrasulfuron-ethyl, cyhalofop-butyl, pretilachlor, and dimethametryn; pyrasulfuron-ethyl, benzobicyclon and penoxsulam; pyrasulfuron-ethyl, benzobicyclon, dimethametryn and oxaziclomefone; pyrasulfuron-ethyl, pretilachlor, dimethametryn, and esprocarb; pyrasulfuron-ethyl, benzobicyclon, butachlor and pyraclonil; pyrasulfuron-ethyl, benzobicyclon and fentrazamide; foramsulfuron and isoxadifen ethyl; foramsulfuron and cyprosulfamide; foramsulfuron and thiencarbazone-methyl; foramsulfuron, iodosulfuron-methyl sodium salt, and isoxadifen ethyl; foramsulfuron, iodosulfuron-methyl sodium salt, cyprosulfamide and thiencarbazone-methyl; iodosulfuron and thiencarbazone-methyl; metsulfuron methyl, bensulfuron-methyl and acetochlor; thifensulfuron-methyl, chlorimuron-ethyl and flumioxazin; rimsulfuron and mesotrione; rimsulfuron and metolachlor; rimsulfuron and dicamba; rimsulfuron, metolachlor and dicamba; thifensulfuron-methyl and one or more of dicamba, 2,4-D-ester, MCPA-ester, clodinafop, quinclorac, fluroxypyr, acetochlor, lenacil and prometryn; chlorimuron-ethyl and acetochlor; chlorimuron-ethyl and metribuzin; chlorimuron-ethyl and imazethapyr.

4.6.2 Safeners

The composition of the present invention may comprise one or more safeners that may be dissolved, dispersed, suspended or otherwise contained in the composition. Suitable safeners are those listed in the "The Pesticide Manual" (ISBN-10: 190139686X), as well as those listed in paragraphs [0113] to [0129] of US 2006/0276337 A1, which paragraphs are incorporated herein by reference.

Exemplary Safeners Include:
(1) compounds of the type of dichlorophenylpyrazoline-3-carboxylic acid such as ethyl 1-(2,4-dichlorophenyl)-5-(ethoxy-carbonyl)-5-methyl-2-pyrazoline-3-carboxylate and related compounds, as described in WO 91/07874;
(2) derivatives of dichlorophenylpyrazolecarboxylic acid, preferably compounds such as ethyl 1-(2,4-dichlorophenyl)-5-methylpyrazole-3-carboxylate, ethyl 1-(2,4-dichlorophenyl)-5-isopropylpyrazole-3-carboxylate, ethyl 1-(2,4-dichlorophenyl)-5-(1,1-dimethylethyl) pyrazole-3-carboxylate, ethyl 1-(2,4-dichlorophenyl)-5-phenylpyrazole-3-carboxylate and related compounds, as described in EP-A-333 131 and EP-A-269 806;
(3) compounds of the type of the triazolecarboxylic acids, preferably compounds such as fenchlorazole, i.e. ethyl 1-(2,4-dichlorophenyl)-5-trichloro-methyl-(1H)-1,2,4-triazole-3-carboxylate, and related compounds (see EP-A-174 562 and EP-A-346 620);
(4) compounds of the type of the 5-benzyl- or 5-phenyl-2-isoxazoline-3-carboxylic acid, or the 5,5-diphenyl-2-isoxazoline-3-carboxylic acid, preferably compounds such as ethyl 5-(2,4-dichlorobenzyl)-2-isoxazoline-3-carboxylate or ethyl 5-phenyl-2-isoxazoline-3-carboxylate and related compounds, as described in WO 91/08202, or ethyl 5,5-diphenyl-2-isoxazolinecarboxylate or n-propyl ester or ethyl 5-(4-fluorophenyl)-5-phenyl-2-isoxazoline-3-carboxylate, as described in the patent application (WO-A-95/07897);
(5) compounds of the type of the 8-quinolineoxyacetic acid, preferably 1-methylhex-1-yl (5-chloro-8-quinolineoxy)acetate, 1,3-dimethylbut-1-yl (5-chloro-8-quinolineoxy)acetate, 4-allyloxybutyl (5-chloro-8-quinolineoxy)acetate, 1-allyloxyprop-2-yl (5-chloro-8-quinolineoxy)acetate, ethyl (5-chloro-8-quinolineoxy) acetate, methyl (5-chloro-8-quinolineoxy)acetate, allyl (5-chloro-8-quinolineoxy)acetate, 2-(2-propylideneiminooxy)-1-ethyl (5-chloro-8-quinolineoxy)acetate, 2-oxoprbp-1-yl (5-chloro-8-quinolineoxy)acetate and related compounds, as described in EP-A-86 750, EP-A-94 349 and EP-A-191 736 or EP-A-0 492 366;

(6) compounds of the type of the (5-chloro-8-quinolineoxy)malonic acid, preferably compounds such as diethyl (5-chloro-8-quinolineoxy)malonate, diallyl (5-chloro-8-quinolineoxy)malonate, methyl ethyl (5-chloro-8-quinoline-oxy)malonate and related compounds, as described in EP-A-0 582 198;

(7) active compounds of the type of the phenoxyacetic or -propionic acid derivatives or the aromatic carboxylic acids, such as, for example, 2,4-dichlorophenoxyacetic acid (esters), 4-chloro-2-methylphenoxy-propionic esters, MCPA or 3,6-dichloro-2-methoxybenzoic acid (esters);

(8) active compounds of the type of the pyrimidines, such as "fenclorim";

(9) active compounds of the type of the dichloroacetamides, which are frequently used as pre-emergence safeners (soil-acting safeners), such as, for example, "dichlormid" (—N,N-diallyl-2,2-dichloroacetamide), "R-29148" (3-dichloroacetyl-2,2,5-trimethyl-1,3-oxazolidone from Stauffer), "benoxacor" (4-dichloroacetyl-3,4-dihydro-3-methyl-2H-1,4-benzoxazine), "PPG-1292" (—N-allyl-N-[(1,3-dioxolan-2-yl)methyl] dichloroacetamide from PPG Industries), "DK-24" (—N-allyl-N-[(allylaminocarbonyl)methyl]dichloroacetamide from Sagro-Chem), "AD-67" or "MON 4660" (3-dichloroacetyl-1-oxa-3-azaspiro[4,5]decane from Nitrokemia or Monsanto), "dicyclonon" or "BAS145138" or "LAB145138" ((3-dichloroacetyl-2,5,5-tri-methyl-1,3-diazabicyclo[4.3.0]nonane from BASF) and "furilazol" or "MON 13900" ((RS)-3-dichloroacetyl-5-(2-furyl)-2,2-dimethyloxazolidone);

(10) active compounds of the type of the dichloroacetone derivatives, such as, for example, "MG 191" (CAS-Reg. No. 96420-72-3) (2-dichloromethyl-2-methyl-1,3-dioxolane from Nitrokemia);

(11) active compounds of the type of the oxyimino compounds, such as, for example, "oxabetrinil" ((Z)-1,3-dioxolan-2-ylmethoxyimino-(phenyl)acetonitrile), "fluxofenim" (1-(4-chlorophenyl)-2,2,2-trifluoro-1-ethanone O-(1,3-dioxolan-2-ylmethyl) oxime, and "cyometrinil" or "CGA43089" ((Z)-cyanomethoxyimino-(phenyl)acetonitrile);

(12) active compounds of the type of the thiazolecarboxylic esters, which are known as seed dressings, such as, for example, "flurazole" (benzyl 2-chloro-4-trifluoromethyl-1,3-thiazole-5-carboxylate);

(3) active compounds of the type of the naphthalenedicarboxylic acid derivatives, such as, for example, "naphthalic anhydride" (1,8-naphthalenedicarboxylic anhydride);

(14) active compounds of the type of the chromanacetic acid derivatives, such as, for example, "CL 304415" (CAS-Reg. No. 31541-57-8) (2-(4-carboxychroman4-yl)acetic acid from American Cyanamid);

(15) active compounds which, in addition to a herbicidal action against harmful plants, also have safener action on crop plants such as, for example, "dimepiperate" or "MY-93" (—S-1-methyl-1-phenylethyl piperidine-1-thiocarboxylate), "daimuron" or "SK 23" (1-(1-methyl-1-phenylethyl)-3-p-tolyl-urea), "cumyluron" or "JC-940" (3-(2-chlorophenylmethyl)-1-(1-methyl-1-phenyl-ethyl)urea, see JP-A-60087254), "methoxyphenone" or "NK, 049" (3,3'-dimethyl-4-methoxybenzophenone), "CSB" (1-bromo-4-(chloromethylsulfonyl)benzene) (CAS-Reg No. 54091-06-4 from Kumiai).

Preferred herbicide safeners for use in the present invention include benoxac BCS (1-bromo-4-[(chloromethyl) sulfonyl]benzene), cloquintocet-mexyl, cyometrinil, cyprosulfamide, dichlormid, dicyclonon, 2-(dichloromethyl)-2-methyl-1,3-dioxolane (MG 191), dietholate, fenchlorazole-ethyl, fenclorim, flurazole, fluxofenim, furilazole, isoxadifen-ethyl, jiecaowan, jiecaoxi, mefenpyr, mefenpyr-ethyl, methoxyphenone ((4-methoxy-3-methylphenyl)(3-methylphenyl)methanone), mephenate, naphthalic anhydride and oxabetrinil.

The liquid composition of the invention may comprise any of the sulfonylureas described herein with any suitable safener described herein. Exemplary combinations of sulfonylurea and safener include: iodosulfuron-methyl (optionally as the sodium salt) and mefenpyr-diethyl; mesosulfuron (and/or as the methyl ester) and mefenpyr-di-ethyl; mesosulfuron (and/or as the methyl ester) and propoxycarbazone (e.g. sodium salt) and mefenpyr-di-ethyl.

4.7 Co-Formulants

The composition of the invention may comprise one or more additional co-formulants such as surfactants (e.g. emulsifiers and/or dispersants), thickeners and thixotropic agents, wetting agents, anti-drift agents, adhesives, penetrants, preservatives, antifreeze agents, antioxidants, solubilizers, fillers, carriers, colorants, antifoams, fertilizers, evaporation inhibitors and agents which modify pH and viscosity. In one embodiment of the invention the liquid composition comprises at least one co-formulant that is an adjuvant, such as one of those listed in the Compendium of Herbicide Adjuvants, 12th Edition, Southern Illinois University, 2014, or any earlier edition thereof. Examples of commonly used adjuvants include, but are not limited to, paraffin oil, horticultural spray oils (e.g., summer oil), methylated rape seed oil, methylated soybean oil, highly refined vegetable oil and the like, polyol fatty acid esters, polyethoxylated esters, ethoxylated alcohols, alkyl polysaccharides and blends, amine ethoxylates, sorbitan fatty acid ester ethoxylates, polyethylene glycol esters, alkylpolyglucosides and their derivatives (e.g. esters), organosilicone based surfactants, ethylene vinyl acetate terpolymers, ethoxylated alkyl aryl phosphate esters and the like.

Preferably, the liquid composition of the invention includes one or more surfactants, for example, to enable the forming an emulsion if the compositions are to be diluted with water. These surfactants can be cationic, anionic or non-ionic, but are preferably anionic or non-ionic.

Preferred non-ionic surfactants for use in this invention include: polyalkoxylated, preferably polyethoxylated, saturated and unsaturated aliphatic alcohols having 8 to 24 carbon atoms in the alkyl radical, which is derived from the corresponding fatty acids or from petrochemical products, and having 1 to 100, preferably 2 to 50, ethylene oxide units (EO), it being possible for the free hydroxyl group to be alkoxylated, which are commercially available, for example, as Genapol® X and Genapol® O series (Clariant), Crovol® M series (Croda) or as Lutensol® series (BASF); polyalkoxylated, preferably polyethoxylated, arylalkylphenols, such as, for example, 2,4,6-tris(1-phenylethyl)phenol (tristyrylphenol) having an average degree of ethoxylation of between 10 and 80, preferably from 16 to 40, such as, for example, Soprophor® BSU (Rhodia) or HOE S 3474 (Clariant); polyalkoxylated, preferably polyethoxylated, alkylphenols having one or more alkyl radicals, such as, for example, nonylphenol or tri-sec-butylphenol, and a degree of ethoxylation of between 2 and 40, preferably from 4 to 15, such as, for example, Arkopal® N series or Sapogenat® T series (Clariant); polyalkoxylated, preferably polyethoxylated, hydroxyfatty acids or glycerides which contain hydroxyfatty acids, such as, for example, ricinine or castor oil, having a degree of ethoxylation of between 10 and 80, preferably from 25 to 40, such as, for example, the Emulsogen® EL series (Clariant) or the Agnique® CSO series (Cognis); polyalkoxylated, preferably polyethoxylated, sorbitan esters, such as, for example, Atplus® 309 F (Uniqema) or the Alkamuls® series (Rhodia); polyalkoxylated, preferably polyethoxylated, amines, such as, for example, Genamin® series (Clariant), Imbentin® CAM series (Kolb) or Lutensol® FA series (BASF); di- and tri-block copolymers, for example from, alkylene oxides, for example from ethylene oxide and propylene oxide, having average molar masses between 200 and 10 000, preferably from 1000 to 4000 g/mol, the proportion by mass of the polyethoxylated block varying between 10 and 80%, such as, for example, the Genapol® PF series (Clariant), the Pluronic® series (BASF), or the Synperonic® PE series (Uniqema).

Preferred ionic surfactants for use in this invention include: polyalkoxylated, preferably polyethoxylated, surfactants which are ionically modified, for example by conversion of the terminal free hydroxyl function of the polyethylene oxide block into a sulfate or phosphate ester (for example as alkali metal and alkaline earth metal salts), such as, for example, Genapol® LRO or dispersant 3618 (Clariant), Emulphor® (BASF) or Crafol® AP (Cognis); alkali metal and alkaline earth metal salts of alkylarylsulfonic acids having a straight-chain or branched alkyl chain, such as phenylsulfonate CA or phenylsulfonate CAL (Clariant), Atlox® 3377BM (ICI), or the Empiphos® TM series (Huntsman); polyelectrolytes, such as lignosulfonates, condensates of naphthalenesulfonate and formaldehyde, polystyrenesulfonate or sulfonated unsaturated or aromatic polymers (polystyrenes, polybutadienes or polyterpenes), such as the Tamol® series (BASF), Morwet® D425 (Witco), the Kraftsperse® (Westvaco) or the Borrespersе® series (Borregard).

Surfactants that can also be used in the present invention include organo-modified siloxanes (OMS) such as those disclosed in the Compendium of Herbicide Adjuvants, 12th Edition, Southern Illinois University, 2014, or any earlier edition thereof, as well as those disclosed in WO 2008/155108 A2 (GAT Microencapsulation), as well as the polyether-polysiloxane copolymers described in GB 2496643 (Rotam Agrochem), including those available from Evonik Industries under the trade names Break-Thru 9902™, Break-Thru 9903™, Break-Thru 5503™, Break-Thru 9907™ and Break-Thru 9908™.

If the liquid composition of the invention comprises one or more surfactants then the surfactant is preferably included in an amount of at least 1 wt. % with respect to the total weight of the composition. More preferably, the surfactant is comprised in an amount of at least 2 wt. %, at least 5 wt. %, at least 10 wt. %, at least 15 wt. %, or at least 20 wt. %. The surfactant is preferably comprised in the composition an amount of 60 wt. % or less. More preferably, the surfactant is comprised in an amount of 50 wt. % or less, 40 wt. % or less, or 30 wt. % or less. Any of the disclosed wt. % lower limits for the amount of surfactant can be combined with any of the disclosed wt. % upper limits to define further suitable wt. % ranges for the purposes of this invention. As an example, further exemplary ranges for the amount of surfactant in the liquid composition include 1 to 60 wt. %, 2 to 50 wt. %, 5 to 40 wt. %, 10 to 30 wt. %, 5 to 50 wt. % and 2 to 40 wt. %. Where more than one surfactant is used the preferred ranges refer to the total amount of surfactant present in the liquid composition.

4.8 Method of Preparation

The composition of the invention can be prepared by known processes, for example by mixing the components and milling the suspended solids or dissolving the solids. Thus, it is possible, for example, to prepare a premix by dissolving soluble auxiliaries and additives in the non-aqueous solvent system. Any soluble agrochemically active compounds used can also be dissolved in the premix. Once the dissolution process has ended, solid sulfonylurea, any other insoluble agrochemically active compounds used and the inorganic salts can be suspended in the mixture.

The coarse suspension is, if appropriate after pregrinding, subjected to fine grinding. In another embodiment, solid sulfonylurea and, if appropriate, any insoluble components used are suspended in the non-aqueous solvent system and subjected to grinding. Any soluble active compounds used and any auxiliaries and additives which do not require grinding or are not required for the grinding process can be added after grinding.

To prepare the mixtures, it is possible to use customary mixing apparatus which, if required, are thermostatted. For pre-grinding, it is possible to use, for example, high-pressure homogenizers or mills operating by the rotor-stator principle, such as Ultraturrax homogenizers, for example those from IKA, or toothed colloid mills, for example from Puck or Fryma. For fine grinding, it is possible to use, for example, bead mills which operate batchwise, for example from Drais, or bead mills which operate continuously, for example from. Bachofen or Eiger.

4.9 Chemical Stability

The invention is concerned with improving chemical stability of a sulfonylurea herbicide in liquid composition comprising a non-aqueous solvent system. Improved chemical stability may be achieved by including, in the liquid composition, at least one inorganic salt selected from the metal carbonates and metal phosphates. The sulfonyl urea, the inorganic salt and the non-aqueous solvent system (as well as any other components in the composition) can be selected to meet desired needs such as to ensure that the liquid composition conforms with one or more local regulatory requirements.

In one aspect of the invention, the sulfonyl urea, the inorganic salt and the non-aqueous solvent system are selected such that the sulfonyl urea exhibits at least 85% chemical stability. Preferably, the sulfonyl urea exhibits at least 90% chemical stability, more preferably at least 95% chemical stability, and still more preferably at least 98% chemical stability. Chemical stability can be determined as a percentage of the sulfonyl urea remaining (e.g. as determined by HPLC) when the liquid composition (e.g. a 50 ml sample of the liquid composition in a 60 ml hermetically sealed Winchester bottle) has been stored at 54° C. for two weeks relative to a corresponding control sample that has been stored at −10° C. for two weeks.

In another aspect of the invention, the liquid composition is one where chemical stability of the sulfonyl urea is improved by at least 2% compared to a corresponding liquid composition that does not contain an inorganic salt according to the invention (instead of salt, an equivalent extra wt. % of solvent is used). Chemical stability of the sulfonylurea for each of the salt-containing liquid composition and the non-salt control composition can be determined as described immediately above. The difference in chemical stability can then be calculated to determine that an improvement of at least 2% is achieved. Preferably, the sulfonyl urea exhibits at least a 5% improvement, more preferably at least a 10% improvement, and even more preferably at least a 50% improvement in chemical stability.

Since the invention is particularly suited to improving the chemical stability of sulfonylureas that are typically considered to be unstable in liquid compositions (e.g. tribenuron-methyl), in still a further aspect of the invention the liquid composition is one where the sulfonyl urea exhibits at least 85% chemical stability (as described above), and is one where the chemical stability of the sulfonyl urea is improved by at least 10% compared to a corresponding liquid composition that does not contain an inorganic salt according to the invention (as described above). In this aspect it is preferable that the sulfonyl urea exhibits at least 90% chemical stability, more preferably at least 95% chemical stability, and even more preferably at least 98% chemical stability.

In each of the above aspects, where the liquid composition comprises more than one sulfonyl urea, the chemical stability, or improvement thereon, is determined based on the total amount of sulfonylurea herbicide in the composition.

4.10 Application of the Composition

The composition of the invention can be applied directly or can be diluted with water and then applied to plant foliage and/or soil by methods commonly employed in the art, such as conventional high-volume hydraulic sprays, low-volume sprays, air-blast, and aerial sprays. The diluted composition may be applied to the plant foliage or to the soil or area adjacent to the plant. The selection of the specific herbicidal compounds in the composition (both sulfonylureas and non-sulfonylureas) and their rates and mode of application are determined by the selectivity of the herbicidal compounds to specific crops and by the prevalent weed species to be controlled and are known to those skilled in the art (e.g. see "The Pesticide Manual" (ISBN-10: 190139686X) and all earlier editions thereof).

4.11 Further Exemplary Liquid Compositions of the Invention

While not intending to be limiting in any way, some further embodiments of the liquid compositions are as follows:

(i) An oil dispersion (OD) comprising a suspension of at least one sulfonylurea and $Na_3PO_4$ in a non-aqueous solvent system, wherein the at least one sulfonylurea is selected from tribenuron-methyl, nicosulfuron, metsulfuron methyl, bensulfuron-methyl, foramsulfuron, pyrazosulfuron-ethyl, chlorsulfuron, amidosulfuron, and triasulfuron.

(ii) An oil dispersion (OD) comprising a suspension of at least one sulfonylurea and $K_3PO_4$ in a non-aqueous solvent system, wherein the at least one sulfonylurea is selected from tribenuron-methyl, nicosulfuron and metsulfuron methyl.

(iii) An oil dispersion (OD) comprising a suspension of at least one sulfonylurea and $Na_2CO_3$ in a non-aqueous solvent system, wherein the at least one sulfonylurea is selected from tribenuron-methyl, nicosulfuron and metsulfuron methyl.

(iv) An oil dispersion (OD) comprising a suspension of at least one sulfonylurea and $Mg_3(PO_4)_2$ in a non-aqueous solvent system, wherein the at least one sulfonylurea is selected from rimsulfuron, benzosulfuron-methyl, mesosulfuron-methyl, thifensulfuron-methyl, and chlorimuron-ethyl.

(v) An oil dispersion (OD) comprising a suspension of at least one sulfonylurea and $AlPO_4$ in a non-aqueous solvent system, wherein the at least one sulfonylurea is selected from metsulfuron-methyl, rimsulfuron and halosulfuron-methyl.

(vi) An emulsifiable concentrate (EC) comprising at least one sulfonylurea and $Na_3PO_4$ in a non-aqueous solvent system, wherein the at least one sulfonylurea is selected from tribenuron-methyl, nicosulfuron metsulfuron methyl, bensulfuron-methyl, foramsulfuron, pyrazosulfuron-ethyl, chlorsulfuron, amidosulfuron, and triasulfuron.

(vii) An emulsifiable concentrate (EC) comprising at least one sulfonylurea and $K_3PO_4$ in a non-aqueous solvent system, wherein the at least one sulfonylurea is selected from tribenuron-methyl, nicosulfuron and metsulfuron methyl.

(viii) An emulsifiable concentrate (EC) comprising at least one sulfonylurea and $Na_2CO_3$ in a non-aqueous solvent system, wherein the at least one sulfonylurea is selected from tribenuron-methyl, nicosulfuron and metsulfuron methyl.

(ix) An emulsifiable concentrate (EC) comprising at least one sulfonylurea and $Mg_3(PO_4)_2$ in a non-aqueous solvent system, wherein the at least one sulfonylurea is selected from rimsulfuron, benzosulfuron-methyl, mesosulfuron-methyl, thifensulfuron-methyl, and chlorimuron-ethyl.

(x) An emulsifiable concentrate (EC) comprising at least one sulfonylurea and $AlPO_4$ in a non-aqueous solvent system, wherein the at least one sulfonylurea is selected from metsulfuron-methyl, rimsulfuron and halosulfuron-methyl.

(xi) A soluble concentrate (SL) comprising at least one sulfonylurea and $Na_3PO_4$ in a non-aqueous solvent system, wherein the at least one sulfonylurea is selected from tribenuron-methyl, nicosulfuron metsulfuron methyl, bensulfuron-methyl, foramsulfuron, pyrazosulfuron-ethyl, chlorsulfuron, amidosulfuron, and triasulfuron.

(xii) A soluble concentrate (SL) comprising at least one sulfonylurea and $K_3PO_4$ in a non-aqueous solvent system, wherein the at least one sulfonylurea is selected from tribenuron-methyl, nicosulfuron and metsulfuron methyl.

(xiii) A soluble concentrate (SL) comprising at least one sulfonylurea and $Na_2CO_3$ in a non-aqueous solvent system, wherein the at least one sulfonylurea is selected from tribenuron-methyl, nicosulfuron and metsulfuron methyl.

(xiv) An soluble concentrate (SL) comprising at least one sulfonylurea and $Mg_3(PO_4)_2$ in a non-aqueous solvent system, wherein the at least one sulfonylurea is selected from rimsulfuron, benzosulfuron-methyl, mesosulfuron-methyl, thifensulfuron-methyl, and chlorimuron-ethyl.

(xv) An soluble concentrate (EC) comprising at least one sulfonylurea and $AlPO_4$ in a non-aqueous solvent system, wherein the at least one sulfonylurea is selected from metsulfuron-methyl, rimsulfuron and halosulfuron-methyl.

(xvi) The liquid composition according to any one of embodiments (i) to (xv) above, wherein the sum amount of sulfonylurea in the compositions is from 0.1 to 60 wt. %, (xvii) The liquid composition according to any one of embodiments (i) to (xvi) above, wherein the amount of $Na_3PO_4$ (embodiments (i), (vi), (xi)) or $K_3PO_4$ (embodiments (ii), (vii), (xii)) or $Na_2CO_3$ (embodiments (iii), (viii), (xiii)) or $Mg_3(PO_4)_2$ (embodiments (iv), (ix), (xiv)) or $AlPO_4$ (embodiments (v), (x), (xv)) in the liquid composition is from 0.01 to 30 wt. %.

(xviii) The liquid composition according to any one of embodiments (1) to (xvii) above, wherein the weight ratio of the inorganic salt to the sum amount of sulfonylurea is from 0.1 to 5.

(xix) The liquid composition according to any one of embodiments (i) to (iii) above, any one of embodiments (vi) to (viii) above, or any one of embodiments (xi) to (xiii) above, wherein the at least one sulfonylurea is tribenuron-methyl, and wherein the weight ratio of $Na_3PO_4$ (embodiments (i), (vi), (xi)) or $K_3PO_4$ (embodiments (ii), (vii), (xii)) or $Na_2CO_3$ (embodiments (iii), (viii), (xiii)) to tribenuron-methyl is from 0.1 to 5, preferably 0.5 to 2.

(xx) The liquid composition according to any one of embodiments (i) to (iii) above, any one of embodiments (vi) to (viii) above, or any one of embodiments (xi) to (xiii) above, wherein the at least one sulfonylurea is nicosulfuron or metsulfuron-methyl, and wherein the weight ratio of $Na_3PO_4$ (embodiments (i), (vi), (xi)) or $K_3PO_4$ (embodiments (ii), (vii), (xii)) or $Na_2CO_3$ (embodiments (iii), (viii), (xiii)) to the nicosulfuron or metsulfuron-methyl is from 0.1 to 5, preferably 0.1 to 1.

(xxi) The liquid composition according to any one of embodiments (i) to (xx) above, comprising at least a second sulfonylurea selected from amidosulfuron, azimsulfuron, bensulfuron, chlorimuron, chlorsulfuron, cinosulfuron, cyclosulfamuron, ethametsulfuron, ethoxysulfuron, flazasulfuron, flucetosulfuron, flupyrsulfuron, foramsulfuron, halosulfuron, imazosulfuron, iodosulfuron, iofensulfuron, mesosulfuron, metazosulfuron, metsulfuron, nicosulfuron, orthosulfamuron, oxasulfuron, primisulfuron, propyrisulfuron, prosulfuron, pyrazosulfuron, rimsulfuron, sulfometuron, sulfosulfuron, thifensulfuron, triasulfuron, tribenuron, trifloxysulfuron, triflusulfuron and tritosulfuron, or salts or esters thereof.

(xxii) The liquid composition according to any one of embodiments (i) to (xxi) above, comprising at least one non-sulfonylurea herbicide selected from 2,4-D (e.g. ester or amine), 2,4-DB, 2,3,6-TBA, acetochlor, acifluorfen, acifluorfen-sodium, aclonifen, alachlor, alloxydim, alloxydim-sodium, ametryn, amicarbazone, aminopyralid, amitrole, anilofos, asulam, atrazine, azafenidin, beflubutamid, benazolin,-benazolin-ethyl, benfuresate, bentazone, benzfendizone, benzobicyclon, benzofenap, bifenox, bilanafos, bispyribac-sodium, bromacil, bromobutide, bromofenoxim, bromoxynil, butachlor, butafenacil, butenachlor, butralin, butroxydim, butylate, cafenstrole, carbetamide, carfentrazone-ethyl, chlomethoxyfen, chloridazon, chlornitrofen, chlorotoluron, cinidon-ethyl, cinmethylin, clefoxydim, clethodim, clodinafop-propargyl, clomazone, clomeprop, clopyralid, cloransulam-ethyl, cumyluron, cyanazine, cycloxydim, cyhalofop-butyl, daimuron, dazomet, desmedipham, dicamba, dichlobenil, dichlorprop, dichlorprop-P, diclofop-methyl, diclosulam, difenzoquat, diflufenican, diflufenzopyr, dikegulac-sodium, dimefuron, dimepiperate, dimethachlor, dimethametryn, dimethenamid, diquat-dibromide, dithiopyr, diuron, dymron, EPTC, esprocarb, ethalfluralin, ethofumesate, ethoxyfen, etobenzanid, fenoxapropethyl, fenoxaprop-P-ethyl, fentrazamide, flamprop-M-isopropyl, flamprop-M-methyl, florasulam, fluazifop, fluazifop-butyl, fluazolate, flucarbazone-sodium, fluchloralin, flufenacet, flufenpyr, flumetsulam, flumiclorac-pentyl, flumioxazin, fluometuron, fluorochloridone, fluoroglycofen-ethyl, flupoxam, fluridone, fluroxypyr, fluroxypyr-butoxypropyl, fluroxypyr-meptyl, flurprimidol, flurtamone, fluthiacet-methyl, fomesafen, glufosinate, glufosinate-ammonium, glyphosate, haloxyfop, haloxyfop-ethoxyethyl, haloxyfop-methyl, haloxyfop-P-methyl, hexazinone, imazamethabenz-methyl, imazamox, imazapic, imazapyr, imazaquin, imazethapyr, indanofan, ioxynil, isoproturon, isouron, isoxaben, isoxachlortole, isoxaflutole, ketospiradox, lactofen, lenacil, linuron, MCPA, MCPB, mecoprop, mecoprop-P, mefenacet, mesotrione, metamifop, metamitron, metazachlor, methabenzthiazuron, methyldymron, metobromuron, metolachlor, metosulam, metoxuron, metribuzin, molinate, monolinuron, naproanilide, napropamide, neburon, norflurazon, orbencarb, oryzalin, oxadiargyl, oxadiazon, oxaziclomefone, oxyfluorfen, paraquat, pelargonic acid, pendimethalin, pendralin, penoxsulam, pentoxazone, pethoxamid, phenmedipham, picloram, picolinafen, pinoxaden, piperophos, pretilachlor, profluazol, profoxydim, prometryn, propachlor, propanil, propaquizafop, propisochlor, propoxycarbazone-sodium, propyzamide, prosulfocarb, pyraclonil, pyraflufen-ethyl, pyrazolate, pyrazoxyfen, pyribenzoxim, pyributicarb, pyridafol, pyridate, pyrifialid, pyriminobac-methyl, pyrithiobac-sodium, quinclorac, quinmerac, quinoclamine, quizalofop-ethyl, quizalofop-P-ethyl, quizalofop-P-tefuryl, sethoxydim, simazine, simetryn, S-metolachlor, sulcotrione, sulfentrazone, sulfosate, tebuthiuron, tepraloxydim, terbuthylazine, terbutryn, thenylchlor, thiazopyr, thiobencarb, tiocarbazil, tralkoxydim, triallate, triaziflam, triclopyr, tridiphane, and trifluralin.

Any of the exemplary embodiments (i) to (xxii) as listed above can be further modified in line with the general description provided herein. By way of example, the sum amount of sulfonylurea in any of the exemplary embodiments (i) to (xxii) can be from 1 to 50 wt. %, 2 to 40 wt. %, 5 to 30 wt. %, 0.5 to 20 wt. %, 7 to 30 wt. %, and 5 to 10 wt. %. By way of a further example, the total amount of inorganic salt selected from the metal phosphates and metal carbonates that is present in the exemplary embodiments (i) to (xxii) can be from 0.1 to 25 wt. %, 1 to 20 wt. %, 1 to 10 wt. %, 0.5 to 10 wt. %, 1 to 5 wt. % and 0.5 to 5 wt. %. By way of a still further example, the weight ratio of the total amount of inorganic salt selected from the metal phosphates and metal carbonates inorganic salt to the total amount of sulfonylurea can be from 0.2 to 4, 0.3 to 3, 0.5 to 2, 0.7 to 2, 0.1 to 2, 1 to 2 and 1 to 5. By way of a further example, any of the exemplary embodiments (i), (vi), or (xi) can further comprise fluroxypyr-meptyl as a non-sulfonylurea. In one aspect of the invention, the exemplary embodiments (i), (vi), (xi) (xvi), (xvii), (xviii), (xx), (xxi) or (xxii) comprise metsulfuron-methyl and fluroxypyr-meptyl. In another aspect of the invention the exemplary embodiments (i), (vi), (xi) (xvi), (xvii), (xviii), (xx), (xxi) or (xxii) comprise metsulfuron-methyl (optionally as the sodium salt), fluroxypyr-meptyl, $Na_3PO_4$ and isobornyl acetate. In still another aspect of the invention the exemplary embodiments (i), (vi), (xi) (xvi), (xvii), (xviii), (xx), (xxi) or (xxii) comprise 0.5 to 2 wt. % metsulfuron-methyl (optionally as the sodium salt), 25 to 35 wt. % fluroxypyr-meptyl, 0.2 to 1 wt. % $Na_3PO_4$ and 40-60 wt. % isobornyl acetate. Any of the exemplary embodiments (i) to (xxii) or as described herein can further comprise a surfactant and/or a safener.

5. EXAMPLES

The oil dispersions described in the following examples were prepared as follows.

(i) Preparation of a 25 wt. % Sulfonylurea Millbase

Sulfonylurea was added to a solvent in an amount of 25 wt. %. The mixture was placed in a mill (Eiger Torrance Mini Mill) containing glass beads (1.0-1.25 mm). The suspension was then led to provide a 25 wt. % sulfonylurea millbase having a particle size (D50) between 2 and 3 μm.

(ii) Preparation of a 30 wt. % Inorganic Salt Millbase

Inorganic salt (anhydrous) was added to solvent in an amount of 30 wt. % and milled as described above to provide a 30 wt. % inorganic salt millbase having a particle size (D50) between 2 and 3 μm. In some examples a polymeric dispersant, Atlox LP1, was included as a milling aid.

(iii) Preparation of the Oil Dispersion

An appropriate amount of the milled concentrate of sulfonylurea (i) was blended with solvent (optionally containing surfactant) until homogenous, and then further blended with milled concentrate of salt (ii) until homogenous, resulting in the oil dispersions as described in the tables below. For formulations containing an additional non-sulfonylurea co-herbicide, the additional herbicide was added as a second milled concentrate (if solid: e.g. terbuthylazine) or dissolved in the solvent/surfactant solution (if liquid: e.g. s-metolachlor).

Emulsifiable concentrates were prepared by blending the milled concentrate of sulfonylurea (i) with surfactant in a solvent and blending this with an appropriate amount of the milled concentrate of salt (ii).

The liquid formulations were stored in tightly closed glass bottles in thermostatically controlled incubators at 54° C. for two weeks with control samples stored at −10° C. After storage, all formulations were analysed for active ingredient content(s) by HPLC. Stability is reported with respect to the amount of active ingredient remaining relative to a corresponding sample stored at −10° C. for two weeks.

Example 1—Effect of Co-Formulated Inorganic Salt on SU Stabilisation

A number of oil dispersions comprising a metsulfuron-methyl (MSM) with or without an added salt were prepared and tested to determine the chemical stability of the sulfonylurea after storage at 54° C. for two weeks. The results are summarised in Table 1 below.

TABLE 1

| Components (wt. %) | Examples | | | | | | Comparative Examples | | | | | |
| --- | --- | --- | --- | --- | --- | --- | --- | --- | --- | --- | --- | --- |
| | OD1 | OD2 | OD3 | OD4 | OD5 | OD6 | OD7 | OD8 | OD9 | OD10 | OD77 | OD11 |
| MSM | 5 | 5 | 5 | 5 | 5 | 5 | 5 | 5 | 5 | 5 | 5 | 5 |
| $Na_3PO_4$ | 2.5 | | | | | | | | | | | |
| $K_3PO_4$ | | 2.5 | | | | | | | | | | |
| $Na_2CO_3$ | | | 2.5 | | | | | | | | | |
| $AlPO_4$ | | | | 2.5 | | | | | | | | |
| $Mg_3(PO_4)_2$ | | | | | 2.5 | | | | | | | |
| $Na_2HPO_4$ | | | | | | 2.5 | | | | | | |
| $Na_2B_4O_7$ | | | | | | | 2.5 | | | | | |
| $Na_3C_6H_5O_7 \cdot 2H_2O$ | | | | | | | | 2.5 | | | | |
| DIOSS | | | | | | | | | 2.5 | | | |
| sodium lignosulfonate | | | | | | | | | | 2.5 | | |
| urea | | | | | | | | | | | 2.5 | |
| Atlox LP1 | 0.02 | 0.02 | 0.02 | 0.02 | 0.02 | 0.02 | 0.02 | 0.02 | 0.02 | 0.02 | 0.02 | |
| Soprophor BSU | 20 | — | 20 | 20 | 20 | 20 | 20 | 20 | 20 | 20 | 20 | 20 |
| Isobornyl acetate | to 100 | to 100 | to 100 | to 100 | to 100 | to 100 | to 100 | to 100 | to 100 | to 100 | to 100 | to 100 |
| Stability (%) | 97.5 | 93.9 | 84.0 | 86.5 | 86.8 | 84.4 | 69.0 | 82.0 | 81.0 | 83.7 | 43.5 | 83.3 |

The chemical stability of a sulfonylurea-containing oil dispersion comprising an inorganic salt selected from the metal carbonates and metal phosphates (OD1-OD6) was found to be superior to an oil dispersion with no co-formulated salt (OD11—similar to the teaching of US 2006/0276337 A1) and oil dispersions using other salts (OD7-OD10), including oil dispersions using DIOSS (sodium dioctyl sulfosuccinate) (OD9—similar to the teaching in US 2006/0276337 A1) and sodium lignosulfonate (OD10—similar to the teaching of WO 2007/027863 A2). Addition of urea (as taught by EP 0554015 A1) increased chemical degradation of MSM (OD77). The chemical instability of metsulfuron-methyl has seriously limited its widespread use in liquid formulations. This problem is overcome by the present invention.

Example 2—Improved Stability of Different Sulfonylureas

A number of oil dispersions comprising different sulfonylurea compounds and different amounts of salt were prepared and tested to determine the chemical stability of the sulfonylurea after storage at 54° C. for two weeks. The results are summarised in Table 2 below.

TABLE 2

| Components (wt. %) | Examples | | | | | | Comparative Examples | | | |
|---|---|---|---|---|---|---|---|---|---|---|
| | OD12 | OD13 | OD14 | OD15 | OD16 | OD17 | OD18 | OD19 | OD20 | OD21 |
| Nicosulfuron | 5 | | | | | | 5 | | | |
| Metsulfuron methyl | | 5 | 5 | | | | | 5 | | |
| Tribenuron-methyl | | | | 5 | 5 | 10 | | | 5 | 10 |
| Na$_3$PO$_4$ | 2.5 | 2.5 | 10 | 5 | 10 | 10 | | | | |
| Atlox LP1 | 0.02 | 0.02 | 0.08 | 0.04 | 0.08 | 0.08 | | | | |
| Soprophor BSU | 20 | 20 | 20 | 20 | 20 | 20 | 20 | 20 | 20 | 20 |
| Isobornyl acetate | to 100 | to 100 | to 100 | to 100 | to 100 | to 100 | to 100 | to 100 | to 100 | to 100 |
| Stability (%) | 99.4 | 97.5 | 99.6 | 91.7 | 93.5 | 96.5 | 86.7 | 83.3 | 0.4 | 29.7 |

Three sulfonylureas having comparatively high stability (nicosulfuron), medium stability (metsulfuron methyl) and low stability (tribenuron-methyl) were chosen for this example. The relative stability of the three chosen sulfonylureas is reflected in the stability data for OD18-OD21. If an inorganic salt selected from the metal carbonates and metal phosphates (OD12-OD17) is included in the oil dispersion, the chemical stability of the sulfonylurea can be greatly improved. The very low stability of sulfonylureas such as tribenuron-methyl has limited their widespread use in liquid compositions. This problem is overcome by the present invention.

Example 3—Sulfonylurea Salts are Also Stabilised

An oil dispersion of the sodium salt of tribenuron-methyl was prepared and tested to determine the chemical stability of the sulfonylurea after storage at 54° C. for two weeks. The results are summarised in Table 3 below.

TABLE 3

| | Examples | | Comparative Example |
|---|---|---|---|
| Components (wt. %) | OD22 | OD23 | OD24 |
| Tribenuron-methyl sodium salt | 2.95 | 2.94 | 3.09 |
| Fluroxypyr-meptyl | 24.15 | 24.12 | 24.69 |
| Na$_3$PO$_4$ | 1.39 | | |
| Na$_2$CO$_3$ | | 1.38 | |
| Atlox LP1 | 0.05 | 0.05 | |
| Soprophor BSU | 18.58 | 18.83 | 18.99 |
| Isobornyl acetate | to 100 | to 100 | to 100 |
| SU Stability (%) | 95 | 81 | 67 |

The data above demonstrates that a co-formulated inorganic salt selected from the metal carbonates and metal phosphates can stabilise a sulfonylurea salt in a liquid composition.

Example 4—Sulfonylureas and Co-Herbicides

A number of oil dispersions comprising different sulfonylurea compounds and different co-herbicide compounds (non-sulfonylureas) were prepared and tested. The results are summarised in Table 4 below.

TABLE 4

| Components (wt. %) | Examples | | | Comparative Examples | | |
|---|---|---|---|---|---|---|
| | OD25 | OD26 | OD27 | OD28 | OD29 | OD30 |
| Metsulfuron-methyl | 1 | 1 | | 1 | 1 | |
| Nicosulfuron | | | 1 | | | |
| s-metolachlor | 32 | | | 32 | | |
| terbuthylazine | | 25 | | | 25 | |
| fluroxypyr-meptyl | | | 32 | | | 32 |
| Na$_3$PO$_4$ | 0.5 | 0.5 | 0.5 | | | |
| Atlox LP1 | 0.004 | 0.004 | 0.004 | | | |
| Soprophor BSU | 20 | 20 | 20 | 20 | 20 | 20 |
| Isobornyl acetate | to 100 | to 100 | to 100 | to 100 | to 100 | to 100 |
| SU Stability (%) | 89.8 | 86.5 | 82.0 | 22.7 | 9.7 | 34.6 |
| Co-herbicide stability (%) | 99.3 | 99.1 | 99.6 | 99.7 | 99.8 | 99.2 |

The addition of a non-sulfonylurea co-herbicide greatly reduces the stability of the sulfonylurea (OD28-OD30). However, the addition of an inorganic salt selected from the metal carbonates and metal phosphates (OD25-OD27) greatly improves the chemical stability of the sulfonylurea even in the presence of a co-herbicide. The present invention overcomes the problem and opens up the opportunity for a multiplicity of novel liquid formulations of sulfonylureas co-formulated with non-sulfonylurea herbicides.

Example 5—Effect of the Emulsifier on SU Stabilisation

A number of oil dispersions comprising metsulfuron-methyl (MSM) and trisodium phosphate with and without an emulsifier were prepared and tested. The results are summarised in Table 5 below.

TABLE 5

| Components (wt. %) | Examples | | | | | |
|---|---|---|---|---|---|---|
| | OD31 | OD32 | OD33 | OD34 | OD35 | OD36 |
| MSM | 5 | 5 | 5 | 5 | 5 | 5 |
| Na$_3$PO$_4$ | 2.5 | 2.5 | 2.5 | 2.5 | 2.5 | 2.5 |
| Soprobor BSU | 20 | | | | | |
| Synperonic 91/6 | | 20 | | | | |
| Etocas 40 | | | 20 | | | |
| Sapogenat T080 | | | | 20 | | |
| Toximul 8320 | | | | | 20 | |
| Atlox LP1 | 0.02 | 0.02 | 0.02 | 0.02 | 0.02 | 0.02 |

TABLE 5-continued

| Components (wt. %) | OD31 | OD32 | OD33 | OD34 | OD35 | OD36 |
|---|---|---|---|---|---|---|
| Isobornyl acetate | to 100 | to 100 | to 100 | to 100 | to 100 | to 100 |
| Stability (%) | 97.5 | 96.5 | 99.0 | 97.8 | 97.5 | 96.2 |

From the data in Table 5 it can be seen that the sulfonylurea is stabilised by the inorganic salt irrespective of the emulsifier that is used (OD31-OD35) and also when no emulsifier is used (OD36; see also OD2). Contrary to the liquid compositions described in WO 2008/155108 A2 and WO2009/152827 A2 which require very specific emulsifier systems, a sulfonylurea-containing liquid composition with co-formulated inorganic salt in accordance with the present invention is stable for a wide range of emulsifying systems.

Example 6—Effect of the Solvent on SU Stabilisation

A number of oil dispersions comprising metsulfuron-methyl (MSM) and a range of solvents with and without trisodium phosphate were prepared and tested. The results are summarised in Table 6-1 (with salt) and Table 6-2 (without salt) below.

TABLE 6-1

| Components (wt. %) | OD37 | OD38 | OD39 | OD40 | OD41 | OD42 |
|---|---|---|---|---|---|---|
| MSM | 5 | 5 | 5 | 5 | 5 | 5 |
| $Na_3PO_4$ | 2.5 | 2.5 | 2.5 | 2.5 | 2.5 | 2.5 |
| Synperonic 91/6 | 20 | 20 | 20 | 20 | 20 | 20 |
| Atlox LP1 | 0.02 | 0.02 | 0.02 | 0.02 | 0.02 | 0.02 |
| Solvesso 200ND | to 100 | | | | | |
| sunflower oil | | to 100 | | | | |
| Isopar M | | | to 100 | | | |
| Exxsol D100 | | | | to 100 | | |
| TEHP | | | | | to 100 | |
| Radia 7961 | | | | | | to 100 |
| Stability (%) | 95.2 | 98.3 | 100 | 97.8 | 96.7 | 95.8 |

TABLE 6-2

| Components (wt. %) | OD43 | OD44 | OD45 | OD46 | OD47 | OD48 |
|---|---|---|---|---|---|---|
| MSM | 5 | 5 | 5 | 5 | 5 | 5 |
| $Na_3PO_4$ | | | | | | |
| Synperonic 91/6 | 20 | 20 | 20 | 20 | 20 | 20 |
| Atlox LP1 | | | | | | |
| Solvesso 200ND | to 100 | | | | | |
| sunflower oil | | to 100 | | | | |
| Isopar M | | | to 100 | | | |
| Exxsol D100 | | | | to 100 | | |
| TEHP | | | | | to 100 | |
| Radia 7961 | | | | | | to 100 |
| Stability (%) | 71.3 | 90.8 | 92.3 | 92.9 | 82.1 | 89.8 |

It can be seen from the data in Table 6-1 that the sulfonylurea is stabilised by the inorganic salt irrespective of the solvent that is used. In the absence of the inorganic salt (Table 6-2), the stability of the sulfonylurea varies considerably with the choice of solvent. Contrary to the liquid compositions described in WO 2007/027863 A2 and WO2009/152827 A2 which require specific solvent systems, a sulfonylurea-containing liquid composition with co-formulated inorganic salt in accordance with the present invention is stable for a wide range of solvent systems.

Example 7—Emulsifiable Concentrate (EC)

An emulsifiable concentrate (EC) comprising metsulfuron-methyl dissolved in a non-aqueous solvent system was prepared with and without an added salt and tested. The results are summarised in Table 7 below.

TABLE 7

| Components (wt. %) | Example EC1 | Comparative Example EC2 |
|---|---|---|
| metsulfuron-methyl | 5 | 5 |
| $Na_3PO_4$ | 2.5 | |
| Soprophor BSU | 20 | 20 |
| Atlox LP1 | 0.02 | |
| Isobornyl acetate | 20.83 | 23.33 |
| n-butylpyrrolidone | 51.65 | 51.67 |
| Stability (%) | 92.0 | 0 |

The data in Table 7 demonstrates that an inorganic salt selected from the metal carbonates and metal phosphates can stabilise a sulfonylurea in an emulsifiable concentrate (EC1). Importantly, stabilisation is even achieved in a solvent system comprising a pyrrolidone solvent as its major component. In the absence of the salt (EC2), such a solvent system causes complete degradation of the sulfonylurea in the accelerated ageing test (and as reported in U.S. Pat. No. 5,731,264). The present invention overcomes problems normally associated with pyrrolidone solvents in liquid compositions.

Example 8—Effect of the Solvent on SU Stabilisation in an Emulsifiable Concentrate (EC)

An emulsifiable concentrate (EC) comprising tribenuron-methyl dissolved in various non-aqueous solvent systems was prepared with and without an added salt and tested. The results are summarised in Table 8-1 (with salt) and Table 8-2 (without salt) below.

TABLE 8-1

| Components (wt. %) | Examples | | | |
|---|---|---|---|---|
| | EC3 | EC4 | EC5 | EC6 |
| tribenuron-methyl | 5 | 5 | 5 | 5 |
| $Na_3PO_4$ | 5 | 5 | 5 | 5 |
| Soprophor BSU | 20 | 20 | 20 | 20 |
| Atlox LP1 | 0.04 | 0.04 | 0.04 | 0.04 |
| Isobornyl acetate | 26.62 | 26.62 | 26.62 | 26.62 |
| Rhodiasolv RDPE | 43.34 | | | |
| Agnique AMD810 | | 43.34 | | |
| DMSO | | | 43.34 | |
| n-butylpyrrolidone | | | | 43.34 |
| Stability (%) | 91.3 | 90.6 | 93.0 | 81.7 |

TABLE 8-2

| Components (wt. %) | Comparative Examples | | | |
|---|---|---|---|---|
| | EC7 | EC8 | EC9 | EC10 |
| tribenuron-methyl | 5 | 5 | 5 | 5 |
| $Na_3PO_4$ | — | — | — | — |
| Soprophor BSU | 20 | 20 | 20 | 20 |
| Atlox LP1 | 0.04 | 0.04 | 0.04 | 0.04 |
| Isobornyl acetate | 31.62 | 31.62 | 31.62 | 31.62 |
| Rhodiasolv RDPE | 43.34 | | | |
| Agnique AMD810 | | 43.34 | | |
| DMSO | | | 43.34 | |
| n-butylpyrrolidone | | | | 43.34 |
| Stability (%) | 0 | 19.1 | 0 | 0 |

The data in Table 8-1 demonstrates that not only can an inorganic salt selected from the metal carbonates and metal phosphates stabilise a comparatively low-stable sulfonylurea in an emulsifiable concentrate, the sulfonylurea is stabilised in a wide range of solvent systems, including one comprising a pyrrolidone solvent.

Example 9—Improved Chemical Stability with $Mg_3(PO_4)_2$ or $AlPO_4$

A number of oil dispersions comprising different sulfonylurea compounds and $Mg_3(PO_4)_2$ or $AlPO_4$ were prepared and tested in the same manner as for Example 1 (Atlox LP1 was not used). The results are summarised in Table 9 below.

TABLE 9

| Components (wt. %) | Examples | | | | | | Comparative Examples | | | | |
|---|---|---|---|---|---|---|---|---|---|---|---|
| | OD49 | OD50 | OD51 | OD52 | OD53 | OD54 | OD55 | OD56 | OD57 | OD58 | OD59 |
| Rimsulfuron | 5 | 5 | | | | | 5 | | | | |
| Benzosulfuron-methyl | | | 5 | | | | | 5 | | | |
| Mesosulfuron-methyl | | | | 5 | | | | | 5 | | |
| Thifensulfuron-methyl | | | | | 5 | | | | | 5 | |
| Chlorimuron-ethyl | | | | | | 5 | | | | | 5 |
| $Mg_3(PO_4)_2$ | 5 | | | 5 | 5 | 5 | 5 | | | | |
| $AlPO_4$ | | 5 | | | | | | | | | |
| Soprophor BSU | 20 | 20 | 20 | 20 | 20 | 20 | 20 | 20 | 20 | 20 | 20 |
| Isobornyl acetate | to 100 | to 100 | to 100 | to 100 | to 100 | to 100 | to 100 | to 100 | to 100 | to 100 | to 100 |
| Stability (%) | 92.7 | 93.0 | 99.8 | 98.7 | 94.2 | 87.8 | 88.8 | 96.4 | 93.0 | 90.3 | 77.5 |

The data above shows that $Mg_3(PO_4)_2$ and $AlPO_4$ can be used to improve the chemical stability of sulfonylurea herbicides in the above liquid compositions.

Example 10—Improved Chemical Ability of Different Sulfonylureas with $Na_3PO_4$

A number of oil dispersions comprising different sulfonylurea compounds and $Na_3PO_4$ were prepared and tested in the same manner as for Example 1 (Atlox. LP1 was not used). The results are summarised in Table 10 below.

TABLE 10

| Components (wt. %) | Examples | | | | | Comparative Examples | | | | |
|---|---|---|---|---|---|---|---|---|---|---|
| | OD60 | OD61 | OD62 | OD63 | OD64 | OD65 | OD66 | OD67 | OD68 | OD69 |
| Benzosulfuron-methyl | 5 | | | | | 5 | | | | |
| Foramsulfuron | | 5 | | | | | 5 | | | |
| Pyrazosulfuron-ethyl | | | 5 | | | | | 5 | | |
| Chlorsulfuron | | | | 5 | | | | | 5 | |
| Triasulfuron | | | | | 5 | | | | | 5 |
| $Na_3PO_4$ | 5 | 5 | 5 | 5 | 5 | | | | | |
| Soprophor BSU | 20 | 20 | 20 | 20 | 20 | 20 | 20 | 20 | 20 | 20 |
| Isobornyl acetate | to 100 | to 100 | to 100 | to 100 | to 100 | to 100 | to 100 | to 100 | to 100 | to 100 |
| Stability (%) | 99.0 | 98.6 | 97.4 | 97.3 | 98.3 | 96.4 | 48.9 | 79.0 | 67.4 | 89.3 |

The data above shows that $Na_3PO_4$ can be used to improve the chemical stability of different sulfonylurea herbicides in the above liquid compositions.

Example 11—Urea as a Chemical Stabilizer for Nicosulfuron and Tribenuron-Methyl

EP 0554015 A1 (Ishihara Sangyo Kaisha) teaches that urea can be used to stabilise nicosulfuron (referred to as "Compound A" in that document). Oil dispersions comprising nicosulfuron were prepared and tested to determine the chemical stability of the sulfonylurea after storage at 60° C. for one week (same ageing test as used in EP 0554015 A1). Stability is reported with respect to the amount of active ingredient remaining as determined by HPLC relative to a corresponding sample stored at −10° C. for one week. The results are summarised in Table 11 below.

TABLE 11-1

| Components (wt. %) | Examples | | Comparative Examples | | | | |
| --- | --- | --- | --- | --- | --- | --- | --- |
| | OD70 | OD71 | OD72 | OD73 | OD74 | OD75 | OD76 |
| Nicosulfuron | 4.91 | 4.91 | 4.91 | 4.91 | | | |
| Tribenuron-methyl | | | | | 4.91 | 4.91 | 4.91 |
| $Na_3PO_4$ | 2.50 | | | | | | |
| $Na_2CO_3$ | | 2.50 | | | | | |
| urea | | | 2.50 | | 1.05 | 3.00 | |
| Sorpol equiv.* | 12.55 | 12.55 | 12.55 | 12.55 | 12.55 | 12.55 | 12.55 |
| Bentonite | 2.09 | 2.09 | 2.09 | 2.09 | 2.09 | 2.09 | 2.09 |
| Maize oil | to 100 | to 100 | to 100 | to 100 | to 100 | to 100 | to 100 |
| Stability (%) | 100.5 | 99.7 | 93.7 | 88.0 | 0 | 0 | 0 |

*Sorpol 3815K (which was used in EP 0554015 A1) was not readily available. Therefore, an estimated Sorpol equivalent made up of equal parts Synperonic 91/6, Aerosol OT-100, Croduret 25 and Atlas G1086 was used instead.

In OD73 (without any stabilizer) the decomposition rate of nicosulfuron was 12.0%. This improved to 6.3% on addition of 2.5 wt. % urea (OD72). Replacing urea with 2.5 wt. % $Na_3PO_4$ (OD70) or $Na_2CO_3$ (OD71) further improved the chemical stability of the nicosulfuron. Urea did not stabilise tribenuron-methyl to any degree in this system.

Example 12—Liquid Composition

A liquid composition comprising a sulfonyl urea in a non-aqueous solvent system (dimethyl sulfoxide) was prepared with and without an added salt and tested. The sulfonylurea was dissolved in the DMSO and the salt (milled) was dispersed as solid particles. The results are summarised in Table 12 below.

TABLE 12

| | Examples | | Comparative Example |
| --- | --- | --- | --- |
| Components (wt. %) | 12-1 | 12-2 | 12-3 |
| tribenuron-methyl | 5 | 5 | 5 |
| $Na_3PO_4$ | 5 | 5 | |
| Soprophor BSU | 10 | 20 | 10 |
| DMSO | 80 | 70 | 85 |
| Stability (%) | 97.1 | 96.4 | 0 |

The data in Table 12 demonstrates that an inorganic salt selected from the metal carbonates and metal phosphates can stabilise a typically unstable sulfonylurea (in this case tribenuron-methyl) in liquid compositions of the invention even if the sulfonylurea and salt are present in different phases.

The above description of the invention and included examples are intended to be illustrative and not limiting. All documents referred to herein are incorporated by reference. Various changes or modifications in the embodiments described herein may occur to those skilled in the art. These changes can be made without departing from the scope or spirit of the invention.

The invention claimed is:

1. A liquid herbicidal composition comprising:
    a non-aqueous solvent system;
    at least one sulfonylurea herbicide selected from tribenuron, or salts or esters thereof; and
    at least one inorganic salt selected from the metal phosphates wherein the at least one inorganic salt comprises a metal selected from Na, K, Ca, Mg or Al and wherein the at least one inorganic salt is not sodium triphosphate.

2. The composition according to claim 1, wherein the inorganic salt is selected from $Na_3PO_4$, $K_3PO4$, $Mg_3(PO_4)_2$, or $A_1PO_4$.

3. The composition according to claim 1, which is formulated as an oil dispersion (OD), a dispersible concentrate (DC), an emulsifiable concentrate (EC), or a soluble concentrate (SL).

4. The composition according to claim 1, which is formulated as an oil dispersion (OD) and wherein at least one sulfonylurea is suspended in the non-aqueous solvent system.

5. The composition according to claim 1, wherein at least one inorganic salt is suspended in the non-aqueous solvent system.

6. The composition according to claim 1, wherein:
    the at least one inorganic salt is $Na_3PO_4$ and the at least one sulfonylurea is selected from tribenuron-methyl.

7. The composition according to claim 1, wherein the at least one sulfonylurea is selected from tribenuron-methyl or salts thereof.

8. The composition according to claim 1, comprising at least one sulfonylurea herbicide or salts or esters thereof and further comprising at least one non-sulfonylurea herbicide, wherein the at least one sulfonylurea herbicide and the at least one non-sulfonylurea herbicide are selected from:
    tribenuron-methyl and fluroxypyr.

9. The composition according to claim 8, wherein at least one non-sulfonylurea herbicidal compound is dissolved in the non-aqueous solvent system.

10. A method of increasing chemical stabilisation of a sulfonylurea herbicide in a liquid composition having a non-aqueous solvent system comprising mixing an inorganic salt selected from metal phosphates with the sulfonylurea herbicide,
    wherein the inorganic salt comprises a metal selected from Na, K, Ca, Mg or Al and wherein the inorganic salt is not sodium triphosphate, and wherein the sulfonylurea herbicide is selected from tribenuron, or salts or esters thereof.

11. The method of claim 10, wherein the inorganic salt is $Na_3PO_4$ and the sulfonylurea is tribenuron-methyl.

12. The method of claim 10, wherein the sulfonylurea is tribenuron-methyl or salts thereof.

* * * * *